United States Patent
Matsuda et al.

(10) Patent No.: US 12,539,697 B2
(45) Date of Patent: Feb. 3, 2026

(54) MULTILAYER BODY, METHOD FOR PRODUCING MULTILAYER BODY, FILM FOR LAMINATION, AND IMAGE DISPLAY DEVICE

(71) Applicant: DAI NIPPON PRINTING CO., LTD., Tokyo (JP)

(72) Inventors: Yoshinari Matsuda, Okayama (JP); Sho Suzuki, Sendai (JP); Osamu Seike, Moriya (JP); Jun Ueda, Mihara (JP); Ryohei Miyata, Neyagawa (JP); Kiyotaka Matsui, Nagareyama (JP); Atsushi Horii, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 641 days.

(21) Appl. No.: 17/756,467

(22) PCT Filed: Nov. 26, 2020

(86) PCT No.: PCT/JP2020/043994
§ 371 (c)(1),
(2) Date: May 25, 2022

(87) PCT Pub. No.: WO2021/107000
PCT Pub. Date: Jun. 3, 2021

(65) Prior Publication Data
US 2023/0001683 A1   Jan. 5, 2023

(30) Foreign Application Priority Data

Nov. 29, 2019   (JP) .................................. 2019-217152

(51) Int. Cl.
B32B 37/14   (2006.01)
B32B 7/12   (2006.01)
(Continued)

(52) U.S. Cl.
CPC .............. *B32B 37/144* (2013.01); *B32B 7/12* (2013.01); *B32B 17/10018* (2013.01);
(Continued)

(58) Field of Classification Search
None
See application file for complete search history.

(56) References Cited

U.S. PATENT DOCUMENTS

2005/0237307 A1   10/2005   Hieda
2011/0027514 A1   2/2011    Matsushita
(Continued)

FOREIGN PATENT DOCUMENTS

CN   1698028     11/2005
CN   101944429   1/2011
(Continued)

OTHER PUBLICATIONS

Office Action issued for Chinese Patent Application No. 202080089572.5, dated Oct. 12, 2023, 10 pages with machine translation.
(Continued)

*Primary Examiner* — Tamra L. Dicus
(74) *Attorney, Agent, or Firm* — HSML P.C.

(57) ABSTRACT

There is provided a laminate in which when the protective plate breaks due to an impact, not only the scattering of large broken pieces but the scattering of powdery fine broken pieces can be suppressed. A laminate including an adherend and an adjacent layer, wherein the adherend has a first major surface, a second major surface being a back surface of the first major surface, and a lateral surface connecting an edge of the first major surface and an edge of the second major surface, at least the first major surface and the lateral surface of the adherend are covered with the adjacent layer, the adjacent layer has at least a plastic film and a hard coat layer containing a cured product of a curable resin composition in (Continued)

this order from the adherend side, and a softening point F1 of the plastic film and a softening point F2 of the hard coat layer satisfy a relationship of F1<F2.

16 Claims, 6 Drawing Sheets

(51) Int. Cl.
  *B32B 17/10*   (2006.01)
  *B32B 33/00*   (2006.01)
  *B32B 37/04*   (2006.01)
  *B32B 37/06*   (2006.01)
  *B32B 37/10*   (2006.01)
  *B32B 37/20*   (2006.01)

(52) U.S. Cl.
  CPC .. *B32B 17/10155* (2013.01); *B32B 17/10688* (2013.01); *B32B 17/10871* (2013.01); *B32B 33/00* (2013.01); *B32B 37/04* (2013.01); *B32B 37/06* (2013.01); *B32B 37/1018* (2013.01); *B32B 37/203* (2013.01); *B32B 2250/02* (2013.01); *B32B 2255/26* (2013.01); *B32B 2307/40* (2013.01); *B32B 2307/738* (2013.01); *B32B 2309/02* (2013.01); *B32B 2309/12* (2013.01); *B32B 2309/68* (2013.01); *B32B 2315/08* (2013.01); *B32B 2398/20* (2013.01); *B32B 2457/20* (2013.01)

(56) References Cited

U.S. PATENT DOCUMENTS

| | | | |
|---|---|---|---|
| 2016/0221870 | A1 | 8/2016 | Arita et al. |
| 2019/0160796 | A1* | 5/2019 | Ponti ...................... B32B 27/34 |

FOREIGN PATENT DOCUMENTS

| | | |
|---|---|---|
| CN | 102015280 | 4/2011 |
| CN | 102076498 | 5/2011 |
| CN | 105636783 | 6/2016 |
| CN | 105793039 | 7/2016 |
| CN | 110073248 | 7/2019 |
| JP | 2005-309021 | 11/2005 |
| JP | 2005309021 A * | 11/2005 |
| JP | 2013-178332 | 9/2013 |
| JP | 2015-171770 | 10/2015 |
| JP | 2019-029845 | 2/2019 |
| WO | 2017/026318 | 2/2017 |
| WO | 2019/235160 | 12/2019 |

OTHER PUBLICATIONS

International Search Report of PCT/JP2020/043994, Jan. 26, 2021, 5 pages including English translation.

Zhang Shuangyin et al., "Mechanical Properties of Composite Structures," Beijing Institute of Technology, 1992, pp. 124-126; A concise explanation of relevance provided in the attached Chinese Office Action.

Zhang Fan et al., "Material Properties," 2nd Edition, Shanghai Jiao Tong University, 2014, pp. 39-41; A concise explanation of relevance provided in the attached Chinese Office Action.

Office Action issued for Chinese Patent Application No. 202080089572.5 on Apr. 27, 2023, 18 pages including machine translation.

\* cited by examiner

MULTILAYER BODY, METHOD FOR PRODUCING MULTILAYER BODY, FILM FOR LAMINATION, AND IMAGE DISPLAY DEVICE

TECHNICAL FIELD

The present disclosure relates to a laminate, a method for manufacturing a laminate, a film for lamination, and an image display.

BACKGROUND ART

Protective plates such as resin plates and glass plates are often disposed on the surfaces of various displays such as TVs, mobile terminals, in-vehicle center information displays, and in-vehicle meters for the purpose of protecting the display devices.

A functional ink may be applied to the protective plate of a display to form a functional layer for the purpose of making the visibility of information such as images and characters good and preventing the scratching of the protective plate.

However, only with the formation of the functional layer on the protective plate, the scattering of the protective plate to the surroundings cannot be suppressed when the protective plate is subjected to a strong impact.

As means for providing a predetermined function to a protective plate and suppressing the scattering of the protective plate, means for bonding a functional film having scattering prevention properties to a protective plate is proposed (for example, PTL1 to PTL2).

CITATION LIST

Patent Literature

PTL1: JP 2015-171770 A
PTL2: JP 2013-178332 A

SUMMARY OF INVENTION

Technical Problem

However, in a laminate in which a functional film having scattering prevention properties is bonded to a protective plate, as in PTL1 to PTL2, the scattering of large broken pieces can be suppressed, but the scattering of powdery fine broken pieces cannot be suppressed, when the protective plate breaks due to an impact.

Solution to Problem

The present inventors have studied diligently and as a result found that powdery fine broken pieces are produced from the lateral surface of a protective plate, which is an adherend on a functional film. Then, the present inventors have diligently studied means for sufficiently covering not only the surface of an adherend but also the lateral surface and as a result completed the present disclosure.

The present disclosure provides the following [1] to [4].
[1] A laminate including an adherend and an adjacent layer, wherein
the adherend has a first major surface, a second major surface being a back surface of the first major surface, and a lateral surface connecting an edge of the first major surface and an edge of the second major surface, at least the first major surface and the lateral surface of the adherend are covered with the adjacent layer,
the adjacent layer has at least a plastic film and a hard coat layer containing a cured product of a curable resin composition in this order from the adherend side, and
a softening point of the plastic film, F1, and a softening point of the hard coat layer, F2, satisfy a relationship of F1<F2.
[2] A method for manufacturing a laminate, including the following steps (1) to (5):
(1) a step of disposing an adherend in a lower side vacuum chamber of a vacuum compressed air machine having an upper side vacuum chamber and the lower side vacuum chamber so that a first major surface side faces an upper side;
(2) a step of disposing the following film for lamination between the upper side vacuum chamber and the lower side vacuum chamber so that an adhesion layer faces a lower side:

Film for Lamination

A film for lamination including at least an adhesion layer, a plastic film, and a hard coat layer containing a cured product of a curable resin composition in this order, wherein a softening point of the plastic film, F 1, and a softening point of the hard coat layer, F2, satisfy a relationship of F1 <F2;
(3) a step of evacuating the upper side vacuum chamber and the lower side vacuum chamber;
(4) a step of pushing up the adherend to the upper side vacuum chamber, while heating the film for lamination, to press the first major surface of the adherend against the heated film for lamination; and
(5) a step of pressurizing the upper side vacuum chamber in a state in which the film for lamination is heated, to bring the film for lamination into close contact with an exposed surface of the adherend.
[3] A film for lamination including at least an adhesion layer, a plastic film, and a hard coat layer containing a cured product of a curable resin composition in this order, wherein a softening point of the plastic film, F1, and a softening point of the hard coat layer, F2, satisfy a relationship of F1<F2.
[4] An image display including the laminate according to [1] on a display device.

Advantageous Effects of Invention

In the laminate and image display of the present disclosure, when the adherend breaks due to an impact, not only the scattering of large broken pieces but the scattering of powdery fine broken pieces can be suppressed. In the method for manufacturing a laminate according to the present disclosure, the above-described laminate can be simply manufactured. The film for lamination of the present disclosure is useful as a material of the laminate.

DESCRIPTION OF EMBODIMENTS

Laminate

The laminate of the present disclosure includes an adherend and an adjacent layer, the adherend has a first major surface, a second major surface being the back surface of the first major surface, and a lateral surface connecting the edge of the first major surface and the edge of the second major surface, at least the first major surface and the lateral surface of the adherend are covered with the adjacent layer, the adjacent layer has at least a plastic film and a hard coat layer containing a cured product of a curable resin composition in this order from the adherend side, and the softening point of the plastic film, F1, and the softening point of the hard coat layer, F2, satisfy the relationship of F1 <F2.

Figure 1:
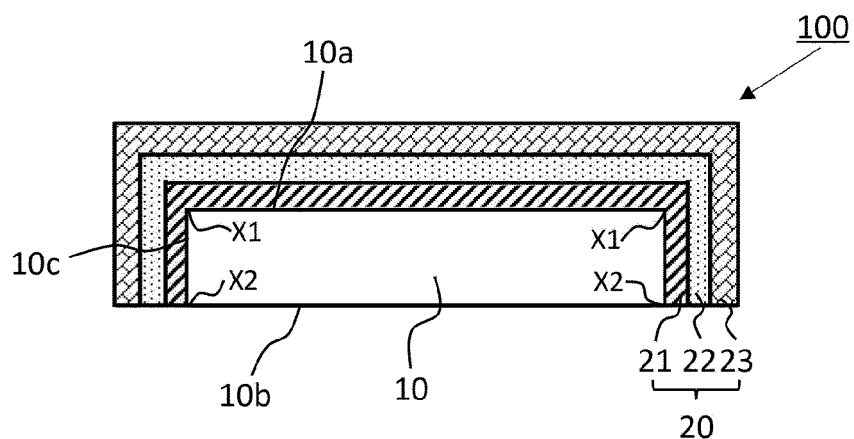
FIG. 1 is a cross-sectional view showing one embodiment of the laminate of the present disclosure.
Figure 2:
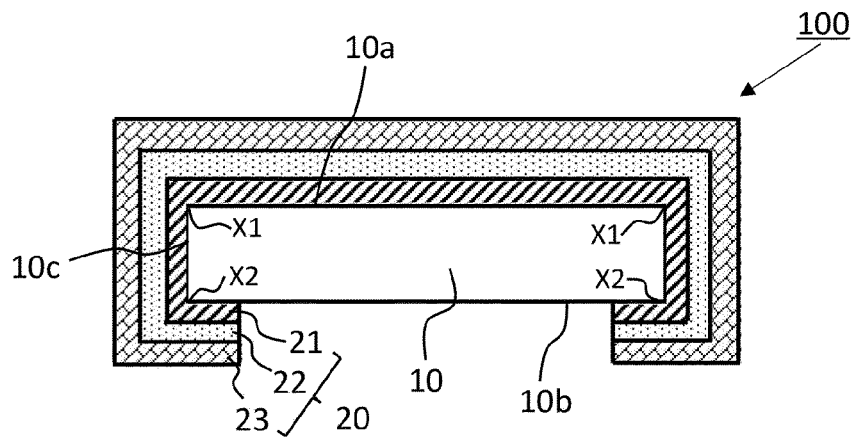
FIG. 2 is a cross-sectional view showing another embodiment of the laminate of the present disclosure.

FIG. 1 to FIG. 2 are cross-sectional views showing embodiments of the laminate of the present disclosure.

The laminates 100 of FIG. 1 to FIG. 2 have an adherend 10 and an adjacent layer 20.

The adherends 10 of FIG. 1 to FIG. 2 have a first major surface 10a, a second major surface 10b being the back surface of the first major surface, and a lateral surface 10c connecting the edge of the first major surface and the edge of the second major surface. In FIG. 1 to FIG. 2, the edge of the first major surface is denoted by character X1, and the edge of the second major surface is denoted by character X2.

The first major surface 10a and lateral surface 10c of each of the adherends 10 of FIG. 1 to FIG. 2 are covered with the adjacent layer 20. In the adherend 10 of FIG. 2, the second major surface 10b is also covered with the adjacent layer 20.

The adjacent layers 20 of FIG. 1 to FIG. 2 have an adhesion layer 21, a plastic film 22, and a hard coat layer 23 containing a cured product of a curable resin composition in this order from the adherend 10 side.

Adherend

As long as the adherend has a first major surface, a second major surface being the back surface of the first major surface, and a lateral surface connecting the edge of the first major surface and the edge of the second major surface, the shape is not particularly limited.

Examples of the planar view shape of the adherend include polygons such as triangles; quadrangles such as squares, rectangles, trapezoids, and parallelograms; polygons such as pentagons; ellipses; circles; stars; and irregular shapes. Among these, quadrangles are preferable for formability.

The cross-sectional shape of the adherend may be a flat plate shape, or part or all may be a curved surface shape.

The edge of the first major surface and the edge of the second major surface can be determined, for example, at the inflection point where the direction of the tangent to the first major surface or the second major surface changes suddenly.

Figure 4:
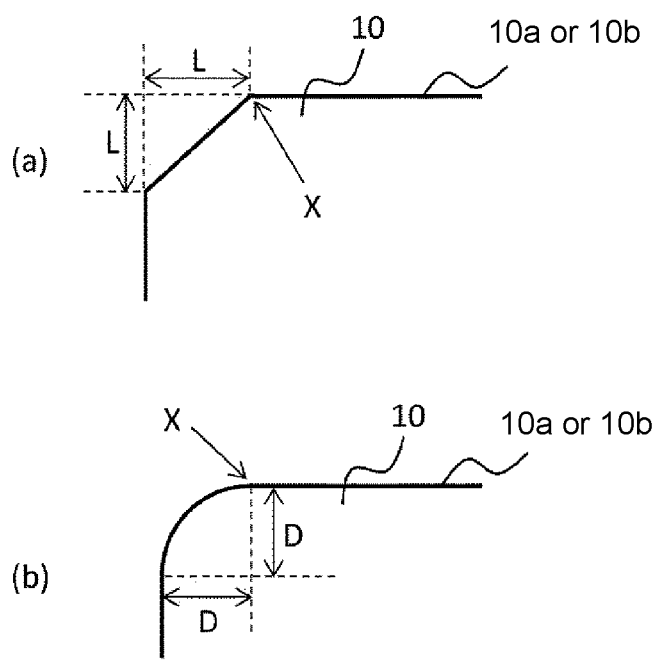
FIG. 4 (a)-(b) are enlarged views each showing one embodiment of the edge of the adherend included in the laminate of the present disclosure.

When the outer peripheral edge of the first major surface is chamfered, the edge of the first major surface means the starting point of chamfering. Similarly, when the outer peripheral edge of the second major surface is chamfered, the edge of the second major surface means the starting point of chamfering. In the cases of FIGS. 4(a) and (b), the position of character X means the edge of the first major surface or the edge of the second major surface.

It is required that at least the first major surface and lateral surface of the adherend be covered with the adjacent layer described later.

An ordinary scattering preventing film covers only the first major surface of an adherend, and therefore the production of powdery fine broken pieces from the lateral surface cannot be suppressed. In the laminate of the present disclosure, not only the first major surface of the adherend but the lateral surface is covered with the adjacent layer, and thus the production of powdery fine broken pieces from the lateral surface can be suppressed.

As used herein, "the first major surface of the adherend is covered with the adjacent layer" means that 99% or more of the surface area of the first major surface of the adherend is covered with the adjacent layer.

As used herein, "the lateral surface of the adherend is covered with the adjacent layer" means that 70% or more of the surface area of the lateral surface of the adherend is covered with the adjacent layer. 80% or more of the surface area of the lateral surface of the adherend is preferably covered with the adjacent layer.

For the lateral surface of the adherend, the lateral surface on the first major surface side is preferably covered with the adjacent layer. Specifically, when attention is paid to the region of 90% of the total surface area of the lateral surface from the first major surface side, the proportion of the region covered with the adjacent layer is preferably 80% or more, more preferably 90% or more.

The first major surface and lateral surface of the adherend are preferably covered with the adjacent layer in close contact. Whether or not the first major surface and lateral surface of the adherend are covered with the adjacent layer in close contact can be determined, for example, by the following (x1) and (x2). (x1) The laminate is cut to fabricate a sample including the interface between the first major surface and lateral surface of the adherend and the adjacent layer. (x2) While the sample is observed by general-purpose means such as an SEM or a TEM, whether or not the interface is in close contact without space is confirmed.

In the adherend, the vicinity of the edge of the second major surface is preferably covered with the adjacent layer. By providing the above-described configuration, the close contact stability between the lateral surface of the adherend and the adjacent layer can be made good, and the production of powdery fine broken pieces from the lateral surface can be more easily suppressed, when the adherend is subjected to an impact.

The vicinity of the edge of the second major surface of the adherend is preferably covered with the adjacent layer in close contact. Whether or not the second major surface of the adherend is covered with the adjacent layer in close contact can be determined, for example, by the following (y1) and (y2). (y1) The laminate is cut to fabricate a sample including the interface between the second major surface of the adherend and the adjacent layer. (y2) While the sample is observed by general-purpose means such as an SEM or a TEM, whether or not the interface is in close contact without space is confirmed.

"The region in the vicinity of the edge of the second major surface covered with the adjacent layer" means the region within 2 mm from the edge of the second major surface. The region is preferably within 3 mm, more preferably within 5 mm, and further preferably within 10 mm from the edge of the second major surface.

As used herein, "the vicinity of the edge of the second major surface of the adherend is covered with the adjacent layer" means that 70% or more of the surface area in the vicinity of the edge of the adherend is covered with the adjacent layer. 80% or more of the surface area in the vicinity of the edge of the adherend is preferably covered with the adjacent layer.

In the adherend, the outer peripheral edge of the first major surface is preferably chamfered over the generally entire periphery. By providing the configuration, the lateral surface of the adherend can be easily covered with the adjacent layer.

In the adherend, the outer peripheral edge of the second major surface is preferably chamfered over the generally entire periphery. By providing the configuration, part of the second major surface of the adherend can be easily covered with the adjacent layer.

As used herein, "the generally entire periphery of the outer peripheral edge of the first major surface" means 90% or more of the entire periphery of the outer peripheral edge of the first major surface. "The generally entire periphery of the outer peripheral edge of the first major surface" is preferably 95% or more, more preferably 97% or more, further preferably 99% or more, and still further preferably 100% of the entire periphery of the outer peripheral edge of the first major surface.

As used herein, "the generally entire periphery of the outer peripheral edge of the second major surface" means 90% or more of the entire periphery of the outer peripheral edge of the second major surface. "The generally entire periphery of the outer peripheral edge of the second major surface" is preferably 95% or more, more preferably 97% or more, further preferably 99% or more, and still further preferably 100% of the entire periphery of the outer peripheral edge of the second major surface.

Figure 3:
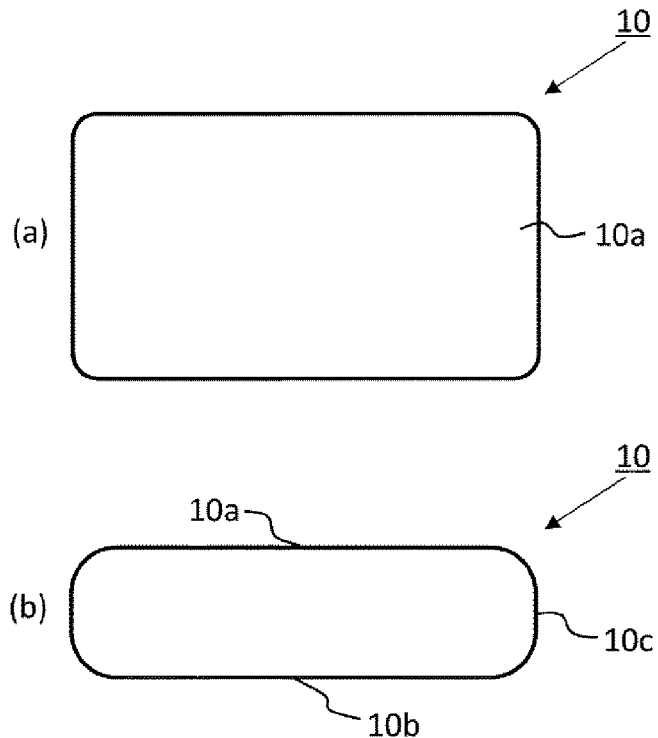
FIG. 3 (a)-(b) are is a cross-sectional views showing one embodiment of the adherend included in the laminate of the present disclosure.

FIG. 3(a) is a plan view showing an embodiment of the adherend 10, and FIG. 3(b) is a cross-sectional view showing an embodiment of the adherend 10. In FIG. 3(a), the four corners of the outer peripheral edge of the first major surface 10a when the adherend 10 is seen in a planar view are chamfered. In FIG. 3(b), the outer peripheral edge of the first major surface 10a and the outer peripheral edge of the second major surface 10b when the adherend 10 is seen in a cross-sectional view are chamfered.

Examples of the chamfering include C chamfering in which an outer peripheral edge is obliquely chamfered, and R chamfering in which an outer peripheral edge is roundly chamfered. Of these, R chamfering is preferable.

FIG. 4(a) is an enlarged view showing an embodiment of C chamfering, and FIG. 4(b) is an enlarged view showing an embodiment of R chamfering.

In the case of C chamfering, the length L of one side of a right triangle having an oblique surface formed by chamfering as the hypotenuse is preferably 0.5 mm or more and 5.0 mm or less, more preferably 1.0 mm or more and 3.0 mm or less (FIG. 4(a)).

In the case of R chamfering, the radius D of a curved surface formed by chamfering is preferably 0.5 mm or more and 5.0 mm or less, more preferably 1.0 mm or more and 4.0 mm or less (FIG. 4(b)).

Examples of the material of the adherend include one selected from the group consisting of glass, ceramics, and resins, or mixtures thereof.

Glass is preferable in that powdery fine broken pieces are easily produced from the lateral surface when glass is subjected to an impact, and the effects of the present disclosure are easily exhibited, and in that the resistance to heat during the forming of the laminate is good. In addition, glass is preferable in that it usually has substantially no phase difference, and therefore the in-plane phase difference of the laminate is easily set in a range described later.

Examples of the glass include soda-lime glass, borosilicate glass, and quartz glass. The glass is preferably toughened glass.

Examples of the ceramics include transparent ceramics such as YAG-based ceramics such as yttrium aluminate and yttrium oxide.

Examples of the resins include one or a mixture selected from the group consisting of polystyrene-based resins, polyolefin-based resins, ABS resins, AS resins, AN resins, polyphenylene oxide-based resins, polycarbonate-based resins, polyacetal-based resins, acrylic resins, polyethylene terephthalate-based resins, polybutylene terephthalate-based resins, polysulfone-based resins, and polyphenylene sulfide-based resins. Among these, polycarbonate-based resins are more preferable.

The preferred thickness of the adherend depends because it differs from material to material, but it is preferably 0.5 mm or more and 5.0 mm or less, more preferably 0.7 mm or more and 3.0 mm or less, and further preferably 1.0 mm or more and 1.8 mm or less.

By setting the thickness of the adherend at 0.5 mm or more, the suitability for protecting a display device or the like can be enhanced. The thickness of the adherend being 0.5 mm or more is also preferable in that powdery fine broken pieces are easily produced from the lateral surface, and the effects of the present disclosure can be easily exhibited.

By setting the thickness of the adherend at 5.0 mm or less, the weight reduction and film thinning of an article to which the laminate of the present disclosure is applied, such as an image display, can be easily achieved.

When the adherend is glass, the thickness is preferably 0.5 mm or more and 3.0 mm or less, more preferably 0.7 mm or more and 2.5 mm or less, and further preferably 1.1 mm or more and 1.8 mm or less.

When the adherend is a resin, the thickness is preferably 1.0 mm or more and 5.0 mm or less, more preferably 1.8 mm or more and 3.0 mm or less, and further preferably 2.0 mm or more and 2.5 mm or less.

<Adjacent Layer>

The adjacent layer has at least a plastic film and a hard coat layer containing a cured product of a curable resin composition in this order from the adherend side. The adjacent layer preferably has an adhesion layer on the side of the adherend side rather than the plastic film in order to make the close contact properties with the adherend good.

It is required that for the plastic film and the hard coat layer constituting the adjacent layer, the softening point F1 of the plastic film and the softening point F2 of the hard coat layer satisfy the relationship of F1 <F2.

When the relationship of F1 <F2 is not satisfied, the plastic film located on the adherend side does not soften prior to the hard coat layer during the forming of the laminate, and therefore it is difficult to cover the first major surface and lateral surface of the adherend with the adjacent layer, and the production of powdery fine broken pieces from the lateral surface cannot be suppressed.

F2 −F1 is preferably 30° C. or more, more preferably 60° C. or more, and further preferably 85° C. or more. By setting F2 −F1 in the range, the first major surface and lateral surface of the adherend can be more easily covered with the adjacent layer.

Measurement of Softening Points

The softening point F1 of the plastic film and the softening point F2 of the hard coat layer can be measured, for example, by the following (z1) and (z2). (z1) A perpendicularly cut sample of the laminate is fabricated. (z2) A probe is brought into contact with the cross section of the sample at any position, and then the minute region in contact with the probe is heated.

As used herein, the temperature at which the peak top of "Deflection" measured under the following measurement conditions is detected is taken as the softening point. As used herein, regarding a layer whose softening point is measured, measurement in five places is performed, and the average value of the measured values in the five places is taken as the softening point of the layer.

The "hard coat layer" in the present disclosure is a layer containing a cured product of a curable resin composition. The softening point of the layer containing a cured product of a curable resin composition usually does not reach less than 33° C. Therefore, as used herein, the hard coat layer whose softening point is not measured at 33° C. or more and 300° C. or less, which is the temperature range of the following measurement conditions, is regarded as having a softening point F2 exceeding 300° C. That is, as used herein, when the softening point F1 of the plastic film is measured and on the other hand the softening point F2 of the hard coat layer is not measured, at 33° C. or more and 300° C. or less, which is the temperature range of the following measurement conditions, F1 <F2 is regarded as being satisfied. In the "hard coat layer" in the present disclosure, the softening point is preferably not measured at 33° C. or more and 300° C. or less, which is the temperature range of the following measurement conditions.

In the hard coat layer whose softening point is not measured at 33° C. or more and 300° C. or less, there is a possibility that the softening point itself is absent, but the absence of the softening point can be regarded as an infinitely high softening point. Therefore, there is no technical problem in regarding F1 <F2 as being satisfied when the softening point F1 of the plastic film is measured and on the other hand the softening point F2 of the hard coat layer is not measured.

Measurement Conditions

Temperature increase rate: 5° C./s
Temperature increase start temperature: 33° C.
Measurement upper limit temperature: 300° C.
Measurement area: 20 μm□

Examples of the apparatus that can measure the softening point from the cross section of the sample include "trade name: Anasys nano IR", which is a nanoscale infrared spectroscopic analysis system manufactured by Bruker Nano Inc.

The sample for softening point measurement whose cross section is exposed can be fabricated, for example, by the following steps (A1) to (A2).

(A1) A cut sample in which the laminate is cut to a predetermined size is fabricated, and then an embedded sample in which the cut sample is embedded in a resin is fabricated. When the adherend is hard and has a thick thickness, the back surface of the adherend may be partially shaved before the cutting operation in order to make the cutting operation easy. The resin for embedding is preferably an epoxy resin.

The embedded sample can be obtained, for example, by disposing the cut sample in a depressed portion of a silicon embedding plate, then pouring a resin for embedding into the depressed portion, then curing the resin for embedding, and then taking the cut sample and the resin for embedding enveloping the cut sample out of the silicon embedding plate. The conditions of the curing of the resin for embedding can be appropriately adjusted according to the type of the resin. In the case of the epoxy resin manufactured by Struers illustrated below, it is preferably left to at ordinary temperature for 12 hours.

Examples of the silicon embedding plate include silicon embedding plates manufactured by DOSAKA EM CO., LTD. For the epoxy resin for embedding, for example, a mixture in which the trade name "EpoFix" manufactured by Struers and the trade name "EpoFix Hardener" manufactured by the company are mixed at 10:1.2 can be used.

(A2) The embedded sample is perpendicularly cut with a diamond knife to fabricate a sample for softening point measurement whose cross section is exposed. When the embedded sample is cut, it is preferably cut so as to pass through the center of the cut sample.

Examples of the apparatus for cutting the embedded sample include the trade name "Ultramicrotome EM UC7" manufactured by Leica Microsystems.

Adhesion Layer

The adjacent layer preferably has an adhesion layer on the side of the adherend rather than the plastic film in order to make the adhesion properties with the adherend good. The adhesion layer is preferably located on the side closest to the adherend among the adjacent layer.

The adhesion layer may be a pressure-sensitive adhesion layer or a heat-sensitive adhesion layer. The pressure-sensitive adhesion layer is also called an "adhesive layer". The heat-sensitive adhesion layer is also called a "heat seal layer".

The heat-sensitive adhesion layer is preferable in that the surface hardness of the laminate is easily increased and in that the adhesion layer does not easily protrude from the edge of the adjacent layer during the forming of the laminate.

The adhesion layer preferably includes a heat-sensitive or pressure-sensitive resin as a main component.

The main component means that its amount is 50% by mass or more of all resins constituting the adhesion layer. The amount is preferably 70% by mass or more, more preferably 90% by mass or more, further preferably 95% by mass or more, and still further preferably 100% by mass.

The adhesion layer preferably includes a heat-sensitive or pressure-sensitive resin suitable for the material of the adherend as a main component.

For example, when the adherend is glass, the adhesion layer preferably includes a resin having one or more functional groups selected from the group consisting of a carboxyl group and a methoxy group.

When the material of the adherend is an acrylic resin, an acrylic resin is preferably used. When the material of the adherend is a polyphenylene oxide-based resin, a polycarbonate-based resin, or a styrene-based resin, an acrylic resin, a polystyrene-based resin, a polyamide-based resin, or the like having an affinity for these resins is preferably used. Further, when the material of the adherend is a polypropylene resin, a chlorinated polyolefin resin, a chlorinated ethylene-vinyl acetate copolymer resin, a cyclized rubber, or a coumarone-indene resin is preferably used.

When the adhesion layer includes a heat-sensitive resin as a main component, the softening point F3 of the adhesion layer (heat-sensitive adhesion layer) is preferably lower than the softening point F1 of the plastic film. That is, the relationship of F3<F1 is preferably satisfied. By satisfying the relationship, the first major surface and lateral surface of the adherend can be more easily covered with the adjacent layer.

The softening point F3 of the heat-sensitive adhesion layer is preferably 30° C. or more and 140° C. or less, more preferably 60° C. or more and 120° C. or less, and further preferably 90° C. or more and 110° C. or less. By setting F3 at 30° C. or more, the hardness as the formed body can be easily made good. By setting F3 at 140° C. or less, a decrease in the close contact properties with the adherend can be easily suppressed.

The absolute value of the difference between F1 and F3 is preferably 200° C. or less. By setting the absolute value of the difference between F1 and F3 at 200° C. or less, a decrease in covering properties due to the easy flow of the adhesion layer in the forming process and the like can be easily suppressed. The absolute value of the difference between F1 and F3 is preferably 100° C. or less, more preferably 50° C. or less.

The thickness of the adhesion layer is preferably 0.1 μm or more and 50 μm or less, more preferably 0.5 μm or more and 30 μm or less.

In the case of a pressure-sensitive adhesion layer, the thickness is preferably 1 μm or more and 50 μm or less, more preferably 5 μm or more and 25 μm or less.

In the case of a heat-sensitive adhesion layer, the thickness is preferably 0.1 μm or more and 30 μm or less, more preferably 1 μm or more and 20 μm or less.

Plastic Film

Examples of the plastic film include a plastic film including one or two or more resins selected from the group consisting of polyolefin-based resins such as polyethylene and polypropylene; vinyl-based resins such as polyvinyl chloride, polyvinylidene chloride, polyvinyl alcohol, ethylene-vinyl acetate copolymers, and ethylene-vinyl alcohol copolymers; polyester-based resins such as polyethylene terephthalate, polyethylene naphthalate, and polybutylene terephthalate; acrylic resins such as polymethyl (meth)acrylate and polyethyl (meth)acrylate; styrene-based resins such as polystyrene; polyamide-based resins typified by nylon 6, nylon 66, or the like; polycarbonate-based resins; amorphous olefins (abbreviation: COP); and the like.

The plastic film may be a single layer or a multilayer such as a coextruded film.

An acrylic film and a polycarbonate-acrylic coextruded film are preferable in that the relationship of F1 <F2 is easily satisfied, and the lateral surface of the adherend can be easily covered with the adjacent layer.

In addition, an acrylic film and a polycarbonate-acrylic coextruded film are preferable because the average of the in-plane phase difference is easily set at 100 nm or less, and a synergistic effect described later is easily exhibited. Particularly, with an acrylic film, the synergistic effect described later is more easily exhibited.

The softening point F1 of the plastic film is preferably 70° C. or more and 150° C. or less, more preferably 100° C. or more and 140° C. or less, and further preferably 110° C. or more and 130° C. or less.

By setting F1 at 70° C. or more, the handling properties of the adjacent layer during the forming of the laminate and the like can be easily made good. When the plastic film softens excessively during the forming of the laminate, the lateral surface and second major surface of the adherend are not easily covered with the adjacent layer. Therefore, in order to easily cover the lateral surface and second major surface of the adherend with the adjacent layer, F1 is preferably 100° C. or more.

By setting F1 at 150° C. or less, too high a temperature during the forming of the laminate can be suppressed, and the yellowing of the plastic film and the deterioration of the hard coat layer can be easily suppressed. In addition, by setting F1 at 150° C. or less, the plastic film softens easily during the forming of the laminate. Therefore, by setting F1 at 150° C. or less, the first major surface, lateral surface, and second major surface of the adherend can be more easily covered with the adjacent layer.

When the average of the in-plane phase difference of the plastic film is defined as Re1, Re1 is preferably 100 nm or less, more preferably 50 nm or less, and further preferably 10 nm or less.

The plastic film having an Re1 of 100 nm or less is preferable in that the extent of orientation is low, and therefore defects such as cracks are not easily produced in the bent portion such as the boundary between the bent portion first major surface and the lateral surface.

In addition, in the plastic film having an Re1 of 100 nm or less, the anisotropy of the in-plane physical properties of the plastic film decreases, and therefore elongation during forming can be easily made uniform. Therefore, when F1<F2 holds, and the Re1 of the plastic film is 100 nm or less, a synergistic effect is produced, and the first major surface and lateral surface of the adherend can be extremely easily covered.

Further, in the plastic film having an Re1 of 100 nm or less, elongation during forming is easily made uniform, and therefore place-to-place variations in the physical properties of the plastic film constituting the laminate can be suppressed in the plane of the laminate. Therefore, with the plastic film having an Re1 of 100 nm or less, the scattering prevention properties of the laminate can also be stabilized. Examples of the above-described physical properties include an erosion rate described later.

Re1, which is the average of the in-plane phase difference of the plastic film, and Re2, which is the average of the in-plane phase difference of the laminate described later, are each the average value of the in-plane phase difference at one point in the region (i) in the vicinity of the central portion of a measurement sample, any four points selected from the region (ii) in the vicinity of the edges of the measurement sample, and any four points selected from the region (iii) other than the vicinity of the central portion and the vicinity of the edges of the measurement sample, a total of nine points.

Figure 5:
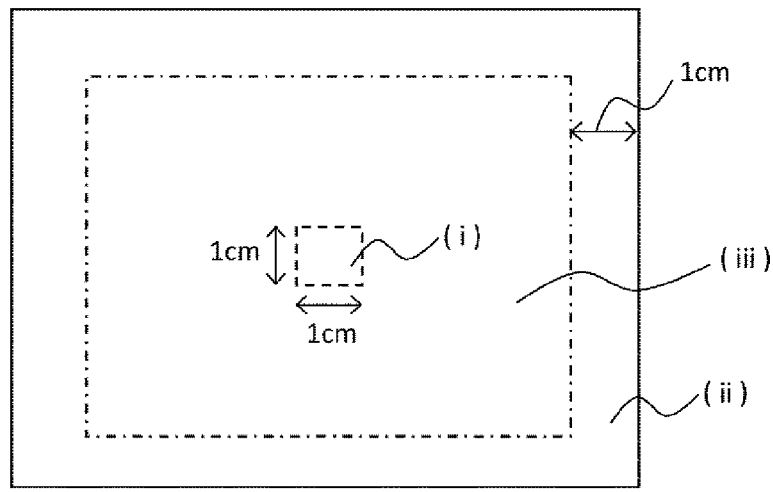
FIG. 5 is a plan view for explaining in-plane phase difference measurement places.

The region (i) in the vicinity of the central portion means the 1 cm² region around the center of gravity of the measurement sample, and the region (ii) in the vicinity of the edges of the measurement sample means the region within 1 cm from the edges of the measurement sample. FIG. 5 is a diagram for explaining the in-plane phase difference measurement places (the region (i), the region (ii), and the region (iii)) when the measurement sample is seen in a planar view.

Any four points selected from the region (ii) and any four points selected from the region (iii) are preferably selected so that the places are balanced.

When the in-plane phase difference in the region (i) of the plastic film, the in-plane phase difference in the region (ii) of the plastic film, and the in-plane phase difference in the region (iii) of the plastic film are defined as Re1C, Re1E, and Re1O, respectively, the absolute value of the difference between Re1C and Re1E is preferably 10 nm or less. Similarly, the absolute value of the difference between Re1C and Re1O is preferably 10 nm or less. Similarly, the absolute value of the difference between Re1O and Re1E is preferably 10 nm or less.

Re1E means the average value of the in-plane phase difference at any four points. Similarly, Re1O means the average value of the in-plane phase difference at any four points.

As used herein, the in-plane phase difference can be represented by the following formula (A) by the refractive index in the slow axis direction, which is the direction in which the refractive index nx is highest in the plane of the measurement sample, the refractive index ny in the fast axis direction, which is the direction orthogonal to the slow axis direction in the plane, and the thickness T [nm] of the measurement sample.

$$\text{in-plane phase difference (Re)}=(nx-ny)\times T[\text{nm}] \quad (A)$$

The in-plane phase difference can be measured, for example, by the trade name "RETS-100" manufactured by Otsuka Electronics Co., Ltd.

As used herein, the in-plane phase difference means the value at a wavelength of 589 nm.

When the in-plane phase difference is measured using the trade name "RETS-100" manufactured by Otsuka Electronics Co., Ltd., it is preferable to prepare for the measurement in accordance with the following procedures (A1) to (A4).
(A1) First, in order to stabilize the light source of RETS-100, the light source is turned on and then allowed to stand for 60 min or more. Subsequently, the rotating analyzer method is selected, and the θ mode (angular direction phase difference measurement and Rth calculation mode) is selected. By selecting this θ mode, the stage is a tilt-rotation stage.
(A2) Then, the following measurement conditions are input to RETS-100.

Measurement Conditions

Retardation measurement range: rotating analyzer method
Measurement spot diameter: φ5 mm
Tilt angle range: 0°
Measurement wavelength range: 400 nm or more and 800 nm or less
Average refractive index of measurement sample
Thickness: Measured value of thickness. For example, the thickness separately measured by an SEM or an optical microscope is described.

(A3) Then, background data is obtained without placing a sample in this apparatus. The apparatus is made a closed system, and this is carried out every time the light source is switched on.
(A4) Subsequently, a sample is placed on the stage in the apparatus, and measurement is performed. It is preferable that the sample be disposed so that the surface on the high flatness side faces the stage side, and measurement be performed.

The thickness of the plastic film is preferably 30 μm or more and 150 μm or less, more preferably 35 μm or more and 100 μm or less, and further preferably 40 μm or more and 80 μm or less.

By setting the thickness of the plastic film at 30 μm or more, the formability of the adjacent layer satisfying the relationship of F1 <F2 can be made better, and the lateral surface of the adherend can be more easily covered with the adjacent layer. By setting the thickness of the plastic film at 150 μm or less, the film thickening of the laminate can be suppressed.

Hard Coat Layer

It is required that the hard coat layer contain a cured product of a curable resin composition. When the hard coat layer does not contain a cured product of a curable resin composition, the formability tends to be good, but the scratch resistance of the laminate cannot be made good.

The cured product of the curable resin composition is a resin component of the hard coat layer. The proportion of the cured product of the curable resin composition to all resin components of the hard coat layer is preferably 50% by mass or more, more preferably 70% by mass or more, and more preferably 90% by mass or more.

Examples of the curable resin composition include thermosetting resin compositions and ionizing radiation-curable resin compositions, and among these, ionizing radiation-curable resin compositions are preferable.

The thermosetting resin compositions are compositions including at least a thermosetting resin and are resin compositions cured by heating. Examples of the thermosetting resin include acrylic resins, urethane resins, phenolic resins, urea-melamine resins, epoxy resins, unsaturated polyester resins, and silicone resins. In the thermosetting resin compositions, a curing agent such as an isocyanate-based curing agent is added to these curable resins as needed.

The ionizing radiation-curable resin compositions are compositions including a compound having an ionizing radiation-curable functional group. Examples of the ionizing radiation-curable functional group include ethylenic unsaturated bond groups such as a (meth)acryloyl group, a vinyl group, and an allyl group, and an epoxy group and an oxetanyl group. The "compound having an ionizing radiation-curable functional group" is hereinafter sometimes referred to as an "ionizing radiation-curable compound".

As the ionizing radiation-curable resin, compounds having an ethylenic unsaturated bond group are preferable. In order to suppress the scratching of the hard coat layer in the process of manufacturing a film for lamination, as the ionizing radiation-curable resin, compounds having two or more ethylenic unsaturated bond groups are more preferable, and among them, polyfunctional (meth)acrylate-based compounds having two or more ethylenic unsaturated bond groups are further preferable. As the polyfunctional (meth)acrylate-based compounds, both monomers and oligomers can be used.

The ionizing radiation means, among the electromagnetic waves or the charged particle beams, electromagnetic waves or charged particle beams having an energy quantum capable of polymerizing or crosslinking a molecule. As the ionizing radiation, usually, ultraviolet rays or electron beams are used, but electromagnetic waves such as X-rays and γrays, and charged particle beams such as α-rays and ion beams can also be used.

Among the polyfunctional (meth)acrylate-based compounds, examples of the bifunctional (meth)acrylate-based monomers include ethylene glycol di(meth)acrylate, bisphenol A tetraethoxy diacrylate, bisphenol A tetrapropoxy diacrylate, and 1,6-hexanediol diacrylate.

Examples of tri- or higher functional (meth)acrylate-based monomers include trimethylolpropane tri(meth)acrylate, pentaerythritol tri(meth)acrylate, pentaerythritol tetra (meth)acrylate, dipentaerythritol hexa(meth)acrylate, dipentaerythritol tetra(meth)acrylate, and isocyanuric acid-modified tri(meth)acrylates.

In the (meth)acrylate-based monomers, part of the molecular skeleton may be modified. Specifically, in the (meth)acrylate-based monomers, part of the molecular skeleton may be modified with ethylene oxide, propylene oxide, caprolactone, isocyanuric acid, an alkyl, a cyclic alkyl, an aromatic, a bisphenol, or the like.

Examples of polyfunctional (meth)acrylate-based oligomers include acrylate-based polymers such as urethane (meth)acrylates, epoxy (meth)acrylates, polyester (meth) acrylates, and polyether (meth)acrylates.

The urethane (meth)acrylates are obtained, for example, by the reaction of a polyhydric alcohol and an organic diisocyanate with a hydroxy(meth)acrylate.

Examples of preferable epoxy (meth)acrylates include (meth)acrylates obtained by reacting a tri- or higher functional aromatic epoxy resin, a tri- or higher functional alicyclic epoxy resin, a tri- or higher functional aliphatic epoxy resin, and the like with (meth)acrylic acid; (meth) acrylates obtained by reacting a bi- or higher functional aromatic epoxy resin, a bi- or higher functional alicyclic epoxy resin, a bi- or higher functional aliphatic epoxy resin, and the like, a polybasic acid, and (meth)acrylic acid; and (meth)acrylates obtained by reacting a bi- or higher functional aromatic epoxy resin, a bi- or higher functional alicyclic epoxy resin, a bi- or higher functional aliphatic epoxy resin, and the like, a phenol, and (meth)acrylic acid.

One of the ionizing radiation-curable resins can be used alone, or two or more of the ionizing radiation-curable resins can be used in combination.

When the ionizing radiation-curable resin is an ultraviolet-curable resin, the application liquid for hard coat layer formation preferably includes additives such as a photopolymerization initiator and a photopolymerization accelerator.

Examples of the photopolymerization initiator include one or more selected from the group consisting of acetophenone, benzophenone, α-hydroxyalkylphenones, Michler's ketone, benzoin, benzil dimethyl ketal, benzoyl benzoate, α-acyloxime esters, thioxanthones, and the like.

The photopolymerization accelerator has a role in reducing polymerization inhibition by air during curing and increasing the curing rate. Examples of the photopolymerization accelerator include one or more selected from the group consisting of isoamyl p-dimethylaminobenzoate ester, ethyl p-dimethylaminobenzoate ester, and the like.

The hard coat layer may include a thermoplastic resin as a resin component.

The hard coat layer may contain additives such as particles, an ultraviolet absorbing agent, a light stabilizer, an antistatic agent, and a leveling agent.

The thickness of the hard coat layer is preferably 1 μm or more and 20 μm or less, more preferably 2 μm or more and 18 μm or less, and further preferably 5 μm or more and 15 μm or less.

By setting the thickness of the hard coat layer at 1 μm or more, the scratch resistance of the laminate can be easily made good. By setting the thickness of the hard coat layer at 20 μm or less, the formability of the adjacent layer can be easily made good.

The softening point F2 of the hard coat layer is preferably 180° C. or more, more preferably 200° C. or more, further preferably 250° C. or more, and still further preferably more than 300° C. in order to easily satisfy the relationship of F1<F2.

Other Layers

The adjacent layer may have other layers other than the adhesion layer, the plastic film, and the hard coat layer.

Examples of other layers include an antireflective layer, an antiglare layer, an antistatic layer, and an anchor layer. An embodiment of an antireflective layer, which is a typical example of other layers, will be described below.

The adjacent layer preferably has an antireflective layer on the side of the hard coat layer opposite to the plastic film. The antireflective layer is preferably disposed on the side farthest from the adherend, of the layers constituting the adjacent layer.

Examples of the antireflective layer include a single-layer structure of a low refractive index layer and a two-layer structure of a high refractive index layer and a low refractive index layer, and further the antireflective layer may be formed of three or more layers. In the case of a two-layer structure of a high refractive index layer and a low refractive index layer, the low refractive index layer is disposed on the surface side, and the high refractive index layer is disposed on the hard coat layer side.

Low Refractive Index Layer

The refractive index of the low refractive index layer is preferably 1.10 or more and 1.48 or less, more preferably 1.20 or more and 1.45 or less, more preferably 1.26 or more and 1.40 or less, more preferably 1.28 or more and 1.38 or less, and more preferably 1.30 or more and 1.35 or less.

The thickness of the low refractive index layer is preferably 80 nm or more and 120 nm or less, more preferably 85 nm or more and 110 nm or less, and more preferably 90 nm or more and 105 nm or less.

The methods for forming the low refractive index layer can be broadly divided into wet methods and dry methods. Examples of the wet methods include a method of forming the low refractive index layer by a sol-gel method using a metal alkoxide and the like, a method of applying a low refractive index resin like a fluororesin to form the low refractive index layer, and a method of applying an application liquid for low refractive index layer formation in which low refractive index particles are contained in a resin composition, to form the low refractive index layer. Examples of the dry methods include a method of selecting particles having the desired refractive index from among low refractive index particles described later and forming the low refractive index layer by a physical vapor deposition method or a chemical vapor deposition method.

The wet methods are excellent in terms of production efficiency. Among the wet methods, the low refractive index layer is preferably formed with an application liquid for low refractive index layer formation in which low refractive index particles are contained in a binder resin composition.

For the low refractive index particles, either particles including an inorganic compound such as silica and magnesium fluoride or particles including an organic compound can be used without limitation. In order to improve antireflection characteristics by a low refractive index, as the low refractive index particles, particles having a structure having a void are preferably used.

The particles having a structure having a void have a fine void inside. The void is filled, for example, with a gas such as air having a refractive index of 1.0. Therefore, the particles having a structure having a void have a low refractive index. Examples of such particles having a void include inorganic or organic porous particles and hollow particles. Examples of the inorganic or organic porous particles and hollow particles include porous silica, hollow silica particles, porous polymer particles, and hollow polymer particles. Examples of the polymers of the porous polymer particles and the hollow polymer particles include acrylic resins.

The average particle diameter of the primary particles of the low refractive index particles is preferably 5 nm or more and 200 nm or less, more preferably 5 nm or more and 100 nm or less, and further preferably 10 nm or more and 80 nm or less.

The content of the low refractive index particles is preferably 50 parts by mass or more and 400 parts by mass or less, more preferably 100 parts by mass or more and 300 parts by mass or less, based on 100 parts by mass of the binder component.

The binder resin composition is preferably a curable resin composition. The curable resin composition is a cured product in the low refractive index layer and is a binder component.

Examples of the curable resin composition include thermosetting resin compositions and ionizing radiation-curable resin compositions, and among these, ionizing radiation-curable resin compositions are preferable.

Examples of the thermosetting resin composition and the ionizing radiation-curable resin composition for the low refractive index layer include the thermosetting resin compositions and the ionizing radiation-curable resin compositions illustrated for the hard coat layer.

The low refractive index layer may contain additives such as an antifouling agent, a leveling agent, and an antistatic agent.

—High Refractive Index Layer—

The antireflective layer may further have a high refractive index layer. When the antireflective layer has a high refractive index layer in addition to the low refractive index layer, the low reflectance wavelength region is extended, and the antireflection properties can be made better.

The high refractive index layer is disposed on the more hard coat layer side than the low refractive index layer.

The high refractive index layer preferably has a refractive index of 1.55 or more and 1.85 or less, more preferably 1.56 or more and 1.70 or less.

The thickness of the high refractive index layer is preferably 200 nm or less, more preferably 50 nm or more and 180 nm or less.

The high refractive index layer can be formed, for example, from a high refractive index layer application liquid including a binder resin composition and high refractive index particles. Examples of the binder resin composition include the curable resin compositions illustrated for the low refractive index layer.

Examples of the high refractive index particles include antimony pentoxide (1.79), zinc oxide (1.90), titanium oxide (2.3 or more and 2.7 or less), cerium oxide (1.95), tin-doped indium oxide (1.95 or more and 2.00 or less), antimony-doped tin oxide (1.75 or more and 1.85 or less), yttrium oxide (1.87), and zirconium oxide (2.10). For the high refractive index particles, the numerical values in parentheses are refractive indices.

The average particle diameter of the primary particles of the high refractive index particles is preferably 5 nm or more and 200 nm or less, more preferably 5 nm or more and 100 nm or less, and further preferably 10 nm or more and 80 nm or less.

Physical Properties of Laminate

Total Light Transmittance and Haze

The laminate preferably has a total light transmittance of 50% or more, more preferably 70% or more, and further preferably 90% or more. The total light transmittance means the total light transmittance prescribed in JIS K7361-1:1997.

The haze of the laminate is preferably 5% or more and 25% or less when antiglare properties are provided. When antiglare properties are not provided, the haze of the laminate is preferably 1.0% or less, more preferably 0.5% or less, and further preferably 0.3% or less. The haze means the haze prescribed in JIS K7136: 2000.

The light incidence plane when the total light transmittance and haze of the laminate are measured is on the adherend side.

Reflectance

When the adjacent layer of the laminate has an antireflective layer, the reflectance of the surface of the laminate on the antireflective layer side is preferably 1.0% or less, more preferably 0.5% or less.

As used herein, the reflectance refers to the luminous reflectance Y value in the CIE1931 standard color system.

As used herein, the reflectance of the surface of the laminate is measured by fabricating a sample in which a black plate is bonded to the adherend side of the laminate via a transparent adhesive layer, and then allowing light to enter from the antireflective layer side of the sample at an incidence angle of 5°. The light source when the reflectance is measured is preferably D65.

The refractive index difference between the adherend and transparent adhesive layer of the sample is preferably within 0.15, more preferably within 0.10, and further preferably within 0.05. The black plate preferably has a total light transmittance, in JIS K7361-1: 1997, of 1% or less, more preferably 0%. The refractive index difference between the refractive index of the resin constituting the black plate and the transparent adhesive layer is preferably within 0.15, more preferably within 0.10, and further preferably within 0.05.

In-Plane Phase Difference

In the laminate of the present disclosure, when the average of the in-plane phase difference of the laminate is defined as Re2, Re2 is preferably 100 nm or less, more preferably 50 nm or less, and further preferably 10 nm or less.

When the state of polarization is disturbed, a rainbow-like stripe pattern may be produced, but by setting Re2 at 100 nm or less, the production of a rainbow-like stripe pattern can be easily suppressed.

When the in-plane phase difference in the region (i) of the laminate, the in-plane phase difference in the region (ii) of the laminate, and the in-plane phase difference in the region (iii) of the laminate are defined as Re2C, Re2E, and Re2O, respectively, the absolute value of the difference between Re2C and Re2E is preferably 10 nm or less. By satisfying the configuration, the visibility of the laminate itself and the visibility of an image observed through the laminate can be easily made uniform in the plane.

Similarly, the absolute value of the difference between Re2C and Re2O is preferably 10 nm or less. Similarly, the absolute value of the difference between Re2O and Re2E is preferably 10 nm or less.

The region (i), the region (ii), and the region (iii) are as described in the part of the in-plane phase difference of the plastic film. That is, the region (i) means the 1 cm$^2$ region around the center of gravity of a measurement sample, the region (ii) means the region within 1 cm from the edges of the measurement sample, and the region (iii) means the place other than the regions (see FIG. 5).

In order to set the in-plane phase difference of the laminate in the above-described range, the laminate is preferably manufactured using an adherend and an adjacent layer having a small in-plane phase difference and by vacuum compressed air forming described later.

Shape Parameter and Scale Parameter

In the laminate of the present disclosure, the following shape parameter is preferably 16.0 or less, more preferably 15.0 or less, and further preferably 12.0 or less.

Calculation of Shape Parameter and Scale Parameter According to Four-Point Bending Test Twenty samples in which the laminate is cut to a width of 130 mm are fabricated. The sample is placed on a support span so that the second major surface side of the adherend faces, the support span, and then a four-point bending test is carried out on each sample to measure the rupture stress of each sample. For the test conditions, the distance between the supporting points of the load span is 20 mm, the distance between the supporting points of the support span is 40 mm, and the load rate is 5 mm/min. The twenty measured values of the rupture stress are subjected to Weibull distribution analysis to calculate the shape parameter and the scale parameter of the laminate.

The Weibull distribution analysis is a probability distribution used when the strength of an object is statistically represented. In the present disclosure, rupture stress is measured as the strength.

The probability density function of the Weibull distribution can be represented by the following formula (B). In formula (B), "x" represents the random variable, "m" represents the shape parameter, and "η" represents the scale parameter. It can be said that the smaller the shape parameter is, the higher the resistance to stress is. It can be said that the larger the scale parameter is, the higher the resistance to stress is. The shape parameter and the scale parameter are both dimensionless values.

In this embodiment, x, which is the random variable, is rupture stress. The shape parameter, m, is also called the Weibull modulus.

$$f(x) = \frac{m}{\eta}\left(\frac{x}{\eta}\right)^{m-1} e^{-\left(\frac{x}{\eta}\right)^m} \tag{B}$$

By setting the shape parameter of the laminate at 16.0 or less, the breaking of the laminate due to stress can be easily suppressed.

In the laminate of the present disclosure, the scale parameter is preferably 3000 or more, more preferably 3200 or more, and further preferably 3400 or more. By setting the scale parameter of the laminate at 3000 or more, the breaking of the laminate due to stress can be easily suppressed.

The shape parameter and scale parameter of the laminate can be easily set in the above ranges, for example, by covering the first major surface and lateral surface of the adherend with the adjacent layer.

In the laminate of the present disclosure, when toughened glass having a thickness of 1.3 mm is used as the adherend, the shape parameter and the scale parameter are more preferably in the above ranges. In the toughened glass having a thickness of 1.3 mm, the thickness of the toughened layer is preferably 6 μm or more and 20 μm or less, more preferably 6 μm or more and 10 μm or less.

Figure 9:
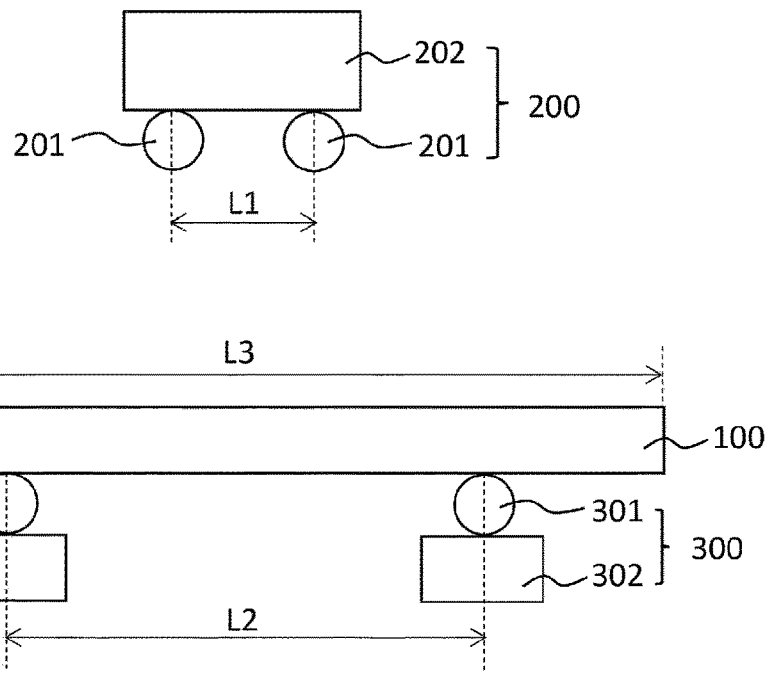
FIG. 9 is a schematic diagram of a four-point bending test.

FIG. 9 is a schematic diagram of the four-point bending test.

In FIG. 9, L1 represents the distance between the supporting points of the load span, L2 represents the distance between the supporting points of the support span, and L3 represents the length of the sample in the long direction. In the present disclosure, L1 is 20 mm, L2 is 40 mm, and L3 is 220 mm. In the present disclosure, the length of the sample in the short direction is 130 mm.

As shown in FIG. 9, the laminate 100 as the sample is placed on a support span 300. At the time, the sample is placed on the support span so that the top and bottom and left and right of the sample are equal. Although not shown, the sample is placed so that the second major surface side of the adherend faces the support span side.

In the four-point bending test, a load span 200 moves downward, and the load pins 201 of the load span come into contact with the laminate 100 as the sample, and thus stress is applied to the laminate 100. The application of stress to the laminate 100 is continued until the laminate 100 ruptures. In the present disclosure, the load rate is 5 mm/min.

The load pins 201 of the load span preferably have a diameter of 3 mm. The support pins 301 of the support span preferably have a diameter of 3 mm.

Examples of the measuring apparatus in the four-point bending test include the trade name "Autograph AGX-50kN" from SHIMADZU CORPORATION. Examples of the analysis software in the four-point bending test include the trade name "TRAPEZIUM X version 1.2.1b" from SHIMADZU CORPORATION.

Erosion Rates

In the laminate of the present disclosure, when the erosion rate in the central portion in the in-plane direction of the plastic film is defined as E1, and the erosion rate in the vicinity of the edge in the in-plane direction of the plastic film is defined as E2, E1/E2 is preferably 0.80 or more and 1.20 or less, more preferably 0.85 or more and 1.15 or less, and further preferably 0.90 or more and 1.10 or less.

By setting E1/E2 in the range, variations in the erosion rate in the in-plane direction of the plastic film are suppressed, and the scattering prevention properties of the laminate can be easily stabilized. By setting the average of the in-plane phase difference of the plastic film at 100 nm or less, E1/E2 can be easily set in the range.

The vicinity of the edge in the in-plane direction of the plastic film means the region within 3 mm from the edge in the in-plane direction of the plastic film. The edge in the in-plane direction of the plastic film means a place overlapping the edge of the first major surface of the adherend in the in-plane direction of the plastic film when the laminate is seen in a planar view.

When the planar view shape of the plastic film is a quadrangle, the four corner portions are preferably selected as the ends. That is, when the planar view shape of the plastic film is a quadrangle, it is preferable to measure the erosion rates in the regions within 3 mm from the four corner portions and then take the average value of the four erosion rates as E2.

In the laminate of the present disclosure, when the erosion rate in the central portion in the in-plane direction of the hard coat layer is defined as E3, and the erosion rate in the vicinity of the edge in the in-plane direction of the hard coat layer is defined as E4, E3/E4 is preferably 0.80 or more and 1.20 or less, more preferably 0.85 or more and 1.15 or less, further preferably 0.90 or more and 1.10 or less, and still further preferably 0.95 or more and 1.05 or less.

By setting E3/E4 in the range, variations in the erosion rate in the in-plane direction of the hard coat layer are suppressed, and the scattering prevention properties of the laminate can be easily stabilized. By satisfying the relationship of F1<F2 to make the formability good, E3/E4 can be easily set in the range.

The vicinity of the edge in the in-plane direction of the hard coat layer means the region within 3 mm from the edge in the in-plane direction of the hard coat layer. When the planar view shape of the hard coat layer is a quadrangle, the four corner portions are preferably selected as the ends. That is, when the planar view shape of the hard coat layer is a quadrangle, it is preferable to measure the erosion rates in the regions within 3 mm from the four corner portions and then take the average value of the four erosion rates as E4.

The erosion rates of the plastic film and the hard coat layer can be measured, for example, under the following measurement conditions.

Measurement Conditions

A test liquid obtained by mixing, at a mass ratio of 968:2:30, pure water, a dispersion, and spherical silica whose average particle diameter is within ±8% based on 5.0 μm is contained in a container. The test liquid in the container is fed to a nozzle. Compressed air is fed into the nozzle, the test liquid is accelerated in the nozzle, and a predetermined amount of the test liquid is jetted perpendicularly to the laminate of the present disclosure from the jet hole at the tip of the nozzle to collide the spherical silica in the test liquid with the laminate. The laminate is placed so that the first major surface side of the adherend faces the nozzle side. The cross-sectional shape of the nozzle is a 1 mm×1 mm square, and the distance between the jet hole and the laminate is 4 mm. The flow rates of the test liquid and the compressed air supplied to the nozzle, the pressure of the compressed air, and the pressure of the test liquid in the nozzle are predetermined values adjusted by calibration described later.

After the predetermined amount of the test liquid is jetted, the jetting of the test liquid is once stopped.

After the jetting of the test liquid is once stopped, the cross-sectional profile is measured for the place on the laminate where the spherical silica in the test liquid collides.

An operation including three steps, as one cycle, consisting of the step of jetting a predetermined amount of the test liquid from the jet orifice, the step of once stopping the jetting of the test liquid after jetting the predetermined amount of the test liquid, and the step of measuring the cross-sectional profile after once stopping the jetting of the test liquid, is executed until the cross-sectional profile reaches the adherend. In each cycle, the erosion rate (μm/g) obtained by dividing the depth of the cross-sectional profile (μm) that advances in each cycle by the amount of the test liquid jetted (g) in each cycle is calculated. By averaging the erosion rates in cycles in which the cross-sectional profile is in the region of the hard coat layer, the E3 or E4 can be calculated. By averaging the erosion rates in cycles in which the cross-sectional profile is in the region of the plastic film, the E1 or E2 can be calculated.

Calibration

The test liquid is contained in the container. The test liquid in the container is fed to the nozzle. Compressed air is fed into the nozzle, the test liquid is accelerated in the nozzle, and any amount of the test liquid is jetted perpendicularly to an acrylic plate having a thickness of 2 mm from the jet hole at the tip of the nozzle to collide the spherical silica in the test liquid with the acrylic plate. The cross-sectional shape of the nozzle is a 1 mm×1 mm square, and the distance between the jet hole and the acrylic plate is 4 mm.

After any amount of the test liquid is jetted, the jetting of the test liquid is once stopped. After the jetting of the test liquid is once stopped, the cross-sectional profile is measured for the place on the acrylic plate where the spherical silica in the test liquid collides.

The erosion rate of the acrylic plate (μm/g) obtained by dividing the depth of the cross-sectional profile (μm) by the any amount (g) is calculated.

The flow rates of the test liquid and the compressed air, the pressure of the compressed air, and the pressure of the test liquid in the nozzle are adjusted for calibration so that the erosion rate of the acrylic plate is in the range of ±5% based on 0.17(μm/g) with the erosion rate of the acrylic plate in the range being the acceptance condition.

The erosion rate measurement conditions will be described below with reference to FIG. 10. Examples of the apparatus for measuring the erosion rate as in FIG. 10 include the product number "MSE-A203", an MSE test apparatus from Palmeso Co., Ltd.

Under the erosion rate measurement conditions of the present disclosure, first, a test liquid obtained by mixing pure water, a dispersing agent, and spherical silica whose average particle diameter is within ±8% based on 5.0 μm at a mass ratio of 968:2:30 is contained in a container (1100). In the container (1100), the test liquid is preferably stirred.

The dispersing agent is not particularly limited as long as the spherical silica can be dispersed. Examples of the dispersing agent include the trade name "Demol N" from Wako Pure Chemical Industries, Ltd.

The "average particle diameter is within ±8% based on 5.0 μm", in other words, means that the average particle diameter is 4.6 μm or more and 5.4 μm or less.

Under the erosion rate measurement conditions herein, "the average particle diameter of the spherical silica" is measured as the volume average value d50 (is a so-called "median diameter") in particle size distribution measurement by a laser light diffraction method.

For the spherical silica, in the results of the particle size distribution measurement, the width of the particle diameters whose frequency is 50 is preferably within ±10% based on 5.0 μm when the frequency of the particle diameter whose frequency is maximum is normalized to 100. "The width of the particle diameters whose frequency is 50" is represented by "X–Y (μm)" when "the particle diameter whose frequency is 50 located in the plus direction with respect to the particle diameter whose frequency is 100" is defined as "X", and "the particle diameter whose frequency is 50 located in the minus direction with respect to the particle diameter whose frequency is 100" is defined as "Y". As used herein, "the width of the particle diameters whose frequency is 50" is sometimes referred to as "the full width at half maximum of the particle size distribution".

Examples of the spherical silica whose average particle diameter is within ±8% based on 5.0 μm include the model number "MSE-BS-5-3" designated by Palmeso Co., Ltd. Examples of the spherical silica corresponding to the model number "MSE-BS-5-3" designated by Palmeso Co., Ltd. include the product number "BS5-3" from Potters-Ballotini Co., Ltd.

The test liquid in the container is fed to a nozzle (5100). The test liquid can be fed to the nozzle, for example, through test liquid piping (21). A flowmeter (3100) for measuring the flow rate of the test liquid is preferably disposed between the container (1100) and the nozzle (5100). The flow rate of the test liquid is a value adjusted by the calibration.

Figure 10:
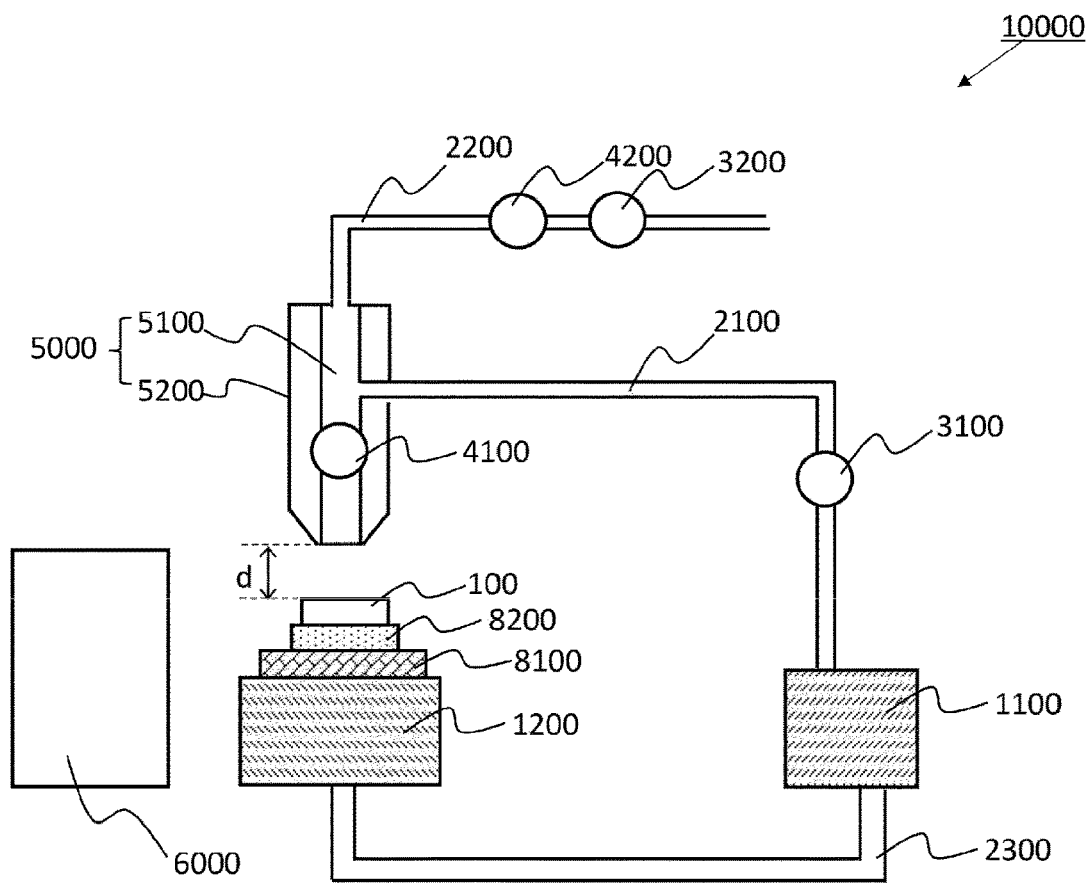
FIG. 10 is a schematic cross-sectional view of an apparatus for measuring an erosion rate.

In FIG. 10, the nozzle (5100) is disposed in a housing (5200) constituting a jet portion (5000).

Compressed air is fed into the nozzle (5100). The compressed air is fed to the nozzle, for example, through compressed air piping (2200). In the nozzle, the position to which the compressed air is fed is preferably on the upstream side with respect to the position to which the test liquid is fed. The upstream side refers to the side far from the jet hole of the nozzle.

A flowmeter (3200) for measuring the flow rate of the compressed air and a pressure gauge (4200) for measuring the pressure of the compressed air are preferably disposed before the compressed air reaches the nozzle (5100). The compressed air can be supplied by an air compressor or the like not shown.

The flow rate and pressure of the compressed air are values adjusted by the calibration.

When the compressed air is fed into the nozzle (5100), the test liquid is accelerated by the compressed air while being mixed. Then, the accelerated test liquid is jetted from the jet hole at the tip of the nozzle (5100) and collides perpendicularly to a laminate (100). The laminate is mainly abraded by the spherical silica particles in the test liquid. The laminate is placed so that the first major surface side of the adherend faces the nozzle side.

In the nozzle (5100), a pressure gauge (4100) for measuring the pressure of the test liquid in the nozzle is preferably disposed. The pressure gauge (4100) is disposed preferably on the downstream side with respect to the position to which the compressed air is fed and the position to which the test liquid is fed.

The pressure of the test liquid in the nozzle (5100) is a value adjusted by the calibration.

Figure 11:
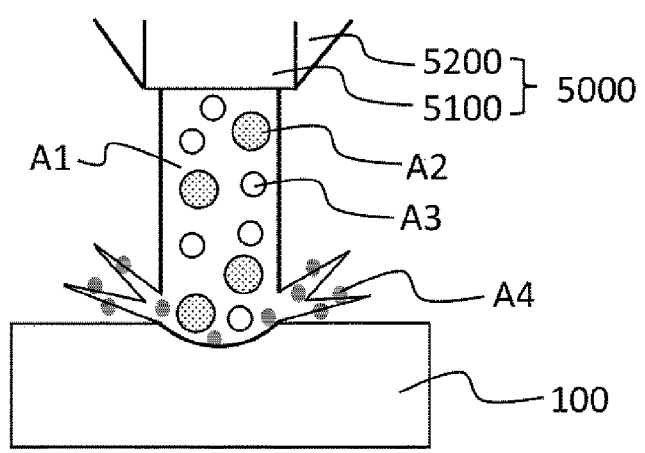
FIG. 11 is an image diagram of a state in which a laminate is abraded by a test liquid including pure water and spherical silica jetted from a jet portion.

The test liquid jetted from the jet hole at the tip of the nozzle (5100) is mixed with air and jetted in the form of a mist. Therefore, the collision pressure of the spherical silica particles on the laminate can be lowered. Thus, the amount of the laminate abraded by one spherical silica particle can be reduced to a trace amount. FIG. 11 is an image diagram of a state in which the laminate (100) is abraded by a test liquid including pure water (A1) and spherical silica (A2) jetted from the jet portion (5000). In FIG. 11, character A3 denotes air, and character A4 denotes the abraded laminate.

In addition, water excellent in cooling effect is included in the test liquid, and therefore the deformation and deterioration of the laminate due to heat during collision can be substantially eliminated. That is, abnormal abrasion of the laminate can be substantially eliminated. Water also has a role in washing the surface of the abraded laminate to achieve stable abrasion. In addition, water has a role in accelerating the spherical silica particles and controlling the fluid of the test liquid.

In addition, an enormous number of spherical silica particles collide with the laminate, and therefore the influence of subtle differences in physical properties between individual spherical silica particles can be eliminated.

Further, for the measurement conditions of the present disclosure, the flow rate of the test liquid supplied to the nozzle, the flow rate of the compressed air supplied to the nozzle, the pressure of the compressed air supplied to the nozzle, and the pressure of the test liquid in the nozzle are values adjusted by the calibration, and the elements that influence the amount of the laminate abraded are specified by specifying the cross-sectional shape of the nozzle to a 1 mm×1 mm square and specifying the distance between the jet hole and the laminate to 4 mm. The distance is the distance denoted by "d" in FIG. 10 and means the perpendicular distance between the jet hole, which is the tip of the nozzle, and the laminate.

From the above, it can be said that the measurement conditions of the present disclosure are measurement conditions under which a statistically stable abrasion mark can be formed on the laminate.

The laminate (100) should be mounted on the specimen mounting stage (8100) of a measuring apparatus (10000). It is preferable to fabricate a laminate 1 in which the laminate is bonded to a support (8200) such as a stainless steel plate, and mount the laminate 1 on the specimen mounting stage (8100). The laminate is placed so that the first major surface side of the adherend faces the nozzle side.

The test liquid jetted to the laminate (100) is preferably collected in a receiver (1200) and returned to the container (1100) through return piping (2300).

The requirements of the measurement conditions of the present disclosure are that after the predetermined amount of the test liquid is jetted, the jetting of the test liquid is once stopped and that after the jetting of the test liquid is once stopped, the cross-sectional profile of the place on the laminate where the spherical silica in the test liquid collides is measured.

The cross-sectional profile means the cross-sectional shape of the laminate abraded by the test liquid. The laminate is mainly abraded by the spherical silica particles in the test liquid.

The cross-sectional profile can be measured by a cross-sectional profile acquisition portion (6000), for example, a stylus type surface shape measuring apparatus and a laser interference type surface shape measuring apparatus. The cross-sectional profile acquisition portion (6000) is usually disposed at a position far from the laminate (100) during the jetting of the test liquid. Therefore, at least either of the laminate (100) and the cross-sectional profile acquisition portion (6000) can be preferably movable.

In the product number "MSE-A203", an MSE test apparatus from Palmeso Co., Ltd, the means for measuring the cross-sectional profile is a stylus type.

As used herein, the erosion rate in each cycle can be represented by the following [formula C]:

the erosion rate (μm/g) in each cycle=the depth of
the cross-sectional profile (μm) that advances in
each cycle/the amount of the test liquid jetted
(g) in each cycle                                    [formula C]

In formula C, "the depth of the cross-sectional profile (μm) that advances in each cycle" means the value represented by "y−x" when the depth of the cross-sectional profile in the nth cycle is defined as x (μm), and the depth of the cross-sectional profile in the n+1th cycle is defined as y (μm). Regarding the first cycle, the depth of the cross-sectional profile (μm) in the first cycle corresponds to "the depth of the cross-sectional profile (μm) that advances in each cycle".

As used herein, the depth of the cross-sectional profile in the nth cycle means the depth of the cross-sectional profile at the deepest position in the nth cycle (n is an integer of 1 or more).

In formula C, "the amount of the test liquid jetted (g) in each cycle" is a "fixed amount" in principle, but there may be some fluctuation from cycle to cycle.

The amount of the test liquid jetted in each cycle is not particularly limited, but the lower limit is preferably 0.3 g or more, more preferably 0.5 g or more, and the upper limit is preferably 3.0 g or less, more preferably 2.0 g or less.

Before the above-described erosion rates are measured, the calibration is performed.

The test liquid used in the calibration is the same as the test liquid used under the measurement conditions carried out later.

The measuring apparatus used in the calibration is the same as the test apparatus used under the measurement conditions carried out later.

A difference between the calibration and the measurement conditions carried out later is, for example, that in the calibration, an acrylic plate having a thickness of 2 mm, which is a standard specimen, is used as the specimen, whereas under the measurement conditions, the laminate is used as the specimen.

The acrylic plate having a thickness of 2 mm, which is a standard specimen, is preferably a polymethyl methacrylate plate. The acrylic plate having a thickness of 2 mm, which is a standard specimen, preferably has an AcE of 0.1615 μm/g or more and 0.1785 μm/g or less when the average of the erosion rate of the acrylic plate measured under the following measurement conditions A is defined as AcE. Examples of the spherical silica under the following measurement conditions A include the model number "MSE-BS-5-3" designated by Palmeso Co., Ltd. Examples of the spherical silica corresponding to the model number "MSE-BS-5-3" designated by Palmeso Co., Ltd. include the product number "BS5-3" from Potters-Ballotini Co., Ltd.

Measurement Conditions A

A test liquid obtained by mixing pure water, a dispersing agent, and spherical silica whose average particle diameter is within ±8% based on 5.0 μm at a mass ratio of 968:2:30 is contained in a container. The test liquid in the container is fed to a nozzle. Compressed air is fed into the nozzle, the test liquid is accelerated in the nozzle, and a predetermined amount of the test liquid is jetted perpendicularly to the acrylic plate from the jet hole at the tip of the nozzle to collide the spherical silica in the test liquid with the acrylic plate. The cross-sectional shape of the nozzle is a 1 mm×1 mm square, and the distance between the jet hole and the acrylic plate is 4 mm. For the flow rates of the test liquid and the compressed air supplied to the nozzle, the pressure of the compressed air, and the pressure of the test liquid in the nozzle, the flow rate of the test liquid is 125 ml/min or more and 128 ml/min or less, the flow rate of the compressed air is 4.5 L/min or more and 4.8 L/min or less, the pressure of the compressed air is 0.174 MPa or more and 0.180 Pa or less, and the pressure of the test liquid in the nozzle is 0.155 MPa or more and 0.160 MPa or less.

After 4 g of the test liquid is jetted, the jetting of the test liquid is once stopped.

After the jetting of the test liquid is once stopped, the cross-sectional profile is measured for the place on the acrylic plate where the spherical silica in the test liquid collides.

Then, AcE (the unit is "μm/g"), which is the erosion rate of the acrylic plate, obtained by dividing the depth of the cross-sectional profile (μm) by the amount of the test liquid jetted (4 g) is calculated.

In the calibration, an operation is carried out in which the flow rates of the test liquid and the compressed air, the pressure of the compressed air, and the pressure of the test liquid in the nozzle are adjusted so that the erosion rate of the acrylic plate is in the range of ±5% based on 0.17(μm/g) with the erosion rate of the acrylic plate in the range being the acceptance condition.

"The erosion rate is ±5% based on 0.17(μm/g)", in other words, means that the erosion rate is 0.1615(μm/g) or more and 0.1785(μm/g) or less.

Film for Lamination

The film for lamination of the present disclosure includes at least an adhesion layer, a plastic film, and a hard coat layer containing a cured product of a curable resin composition in this order, and the softening point F1 of the plastic film and the softening point F2 of the hard coat layer satisfy the relationship of F1<F2.

Figure 6:
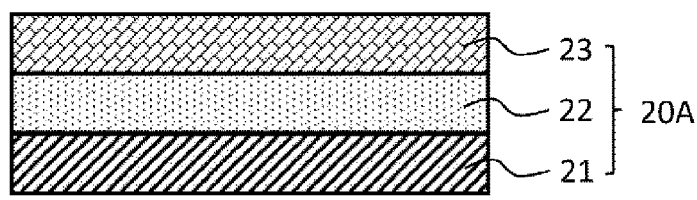
FIG. 6 is a cross-sectional view showing one embodiment of the film for lamination of the present disclosure.
Figure 7:
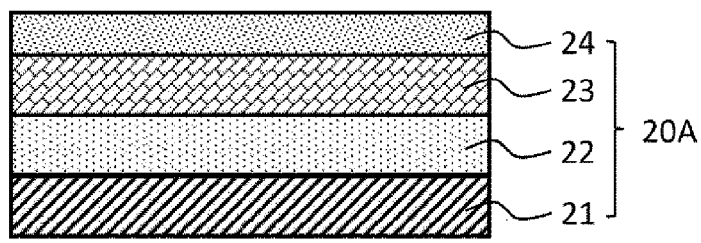
FIG. 7 is a cross-sectional view showing another embodiment of the film for lamination of the present disclosure.

FIG. 6 to FIG. 7 are cross-sectional views showing embodiments of the film for lamination of the present disclosure.

The films for lamination 20A of FIG. 6 to FIG. 7 have an adhesion layer 21, a plastic film 22, and a hard coat layer 23 containing a cured product of a curable resin composition in this order. Further, the film for lamination 20A of FIG. 7 has an antireflective layer 24 on the side of the hard coat layer 23 opposite to the plastic film 22.

Examples of embodiments of the layer configuration of the film for lamination of the present disclosure include the same embodiments as the layer configuration of the adjacent layer constituting the laminate of the present disclosure described above. Examples of embodiments of the adhesion layer, the plastic film, and the hard coat layer, and other layers included as needed constituting the film for lamination of the present disclosure include the embodiments of the adhesion layer, the plastic film, and the hard coat layer, and other layers included as needed constituting the adjacent layer described above.

The film for lamination of the present disclosure may have a separator on the side of the adhesion layer opposite to the plastic film. The separator should be peeled and removed during the forming of the laminate and may be a paper separator or a film separator.

Method for Manufacturing Laminate

The laminate of the present disclosure is preferably manufactured by vacuum compressed air forming.

The vacuum compressed air forming have, for example, the following steps (1) to (5).
(1) The step of disposing an adherend in the lower side vacuum chamber of a vacuum compressed air machine having an upper side vacuum chamber and the lower side vacuum chamber so that the first major surface side faces the upper side.
(2) The step of disposing the following film for lamination between the upper side vacuum chamber and the lower side vacuum chamber so that the adhesion layer faces the lower side.

Film for Lamination

A film for lamination including at least an adhesion layer, a plastic film, and a hard coat layer containing a cured product of a curable resin composition in this order, wherein the softening point F1 of the plastic film and the softening point F2 of the hard coat layer satisfy the relationship of F1<F2.
(3) The step of evacuating the upper side vacuum chamber and the lower side vacuum chamber.
(4) The step of pushing up the adherend to the upper side vacuum chamber, while heating the film for lamination, to press the first major surface of the adherend against the heated film for lamination.
(5) The step of pressurizing the upper side vacuum chamber in a state in which the film for lamination is heated, to bring the film for lamination into close contact with the exposed surface of the adherend.

Figure 8:
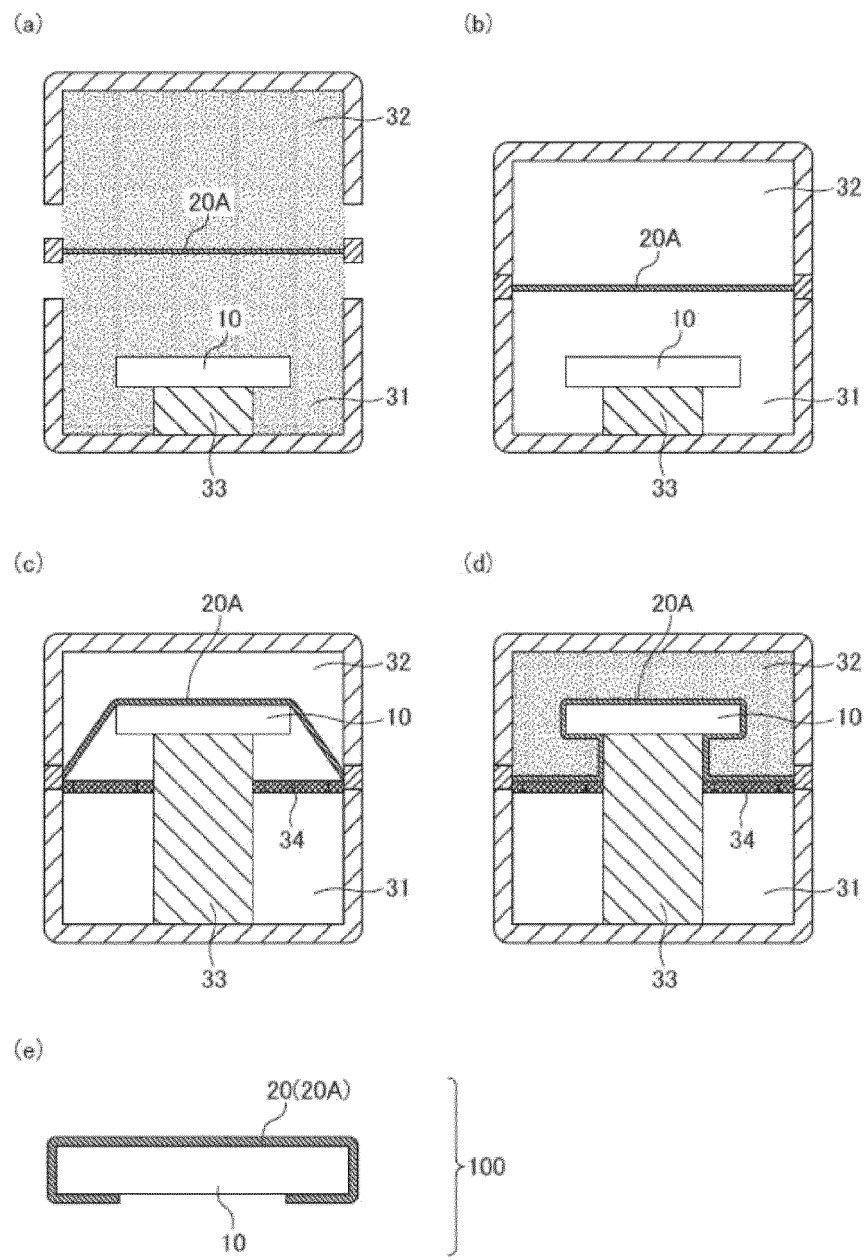
FIG. 8 (a)-(e) are process charts showing one embodiment of a method for manufacturing a laminate according to the present disclosure.

Embodiments of the steps will be described below with reference to FIG. 8.

The step (1) is the step of disposing an adherend 10 in the lower side vacuum chamber 31 of a vacuum compressed air machine having an upper side vacuum chamber 32 and the lower side vacuum chamber 31 so that the first major surface side faces the upper side (see FIG. 8(a)).

As in FIG. 8(a), a general-purpose vacuum pressure bonding machine has two upper and lower vacuum chambers, the upper side vacuum chamber 32 and the lower side vacuum chamber 31. A stage 33 capable of lifting and lowering vertically is placed in the lower side vacuum chamber 31 of the general-purpose vacuum pressure bonding machine. In the step (1), the adherend 10 is disposed on the stage 33, for example, so that the first major surface side faces the upper side.

The step (2) is the step of disposing the following film for lamination 20A between the upper side vacuum chamber 32 and the lower side vacuum chamber 31 so that the adhesion layer faces the lower side (see FIG. 8(a)).

Film for Lamination

A film for lamination including at least an adhesion layer, a plastic film, and a hard coat layer containing a cured product of a curable resin composition in this order, wherein the softening point F1 of the plastic film, and the softening point F2 of the hard coat layer satisfy the relationship of F1<F2.

The general-purpose vacuum pressure bonding machine is equipped with a jig for setting the film for lamination for covering the adherend between the upper and lower vacuum chambers. In the step (2), the film for lamination 20A is disposed, for example, by the jig so that the adhesion layer faces the lower side.

In the steps (1) and (2), the upper and lower vacuum chambers are in a state open to atmospheric pressure.

The step (3) is the step of evacuating the upper side vacuum chamber 32 and the lower side vacuum chamber 31 (see FIG. 8(b)).

In the evacuation, the upper and lower vacuum chambers are each closed, and then the upper and lower vacuum chambers are each evacuated to make the inside vacuum (for example, a vacuum pressure of 0.1 Pa or more and 100 Pa or less).

The step (4) is the step of pushing up the adherend 10 to the upper side vacuum chamber, while heating the film for lamination 20A, to press the first major surface of the adherend 10 against the heated film for lamination 20A (see FIG. 8(c)).

Examples of the means for pushing up the adherend to the upper side vacuum chamber in the step (4) include means for lifting the stage in the lower side vacuum chamber.

In the step (4) and the step (5), the film for lamination is preferably heated so that the surface temperature on the hard coat layer side based on the plastic film of the film for lamination exceeds the softening point F1 of the plastic film.

By setting such a temperature condition, the formability is better, and the lateral surface of the adherend can be easily covered with the film for lamination as an adjacent layer.

In the step (4) and the step (5), the surface temperature on the hard coat layer side based on the plastic film of the film for lamination is preferably 160° C. or less, more preferably 150° C. or less, and further preferably 140° C. or less.

In the step (4) and the step (5), the heat treatment can be performed, for example, by a lamp heater incorporated into the ceiling portion of the upper side vacuum chamber.

In the step (4) and the step (5), the upper and lower vacuum chambers are partitioned by a partition plate 34 or the like.

The step (5) is the step of pressurizing the upper side vacuum chamber in a state in which the film for lamination is heated, to bring the film for lamination into close contact with the exposed surface of the adherend (see FIG. 8(d)).

In the step (5), the upper side vacuum chamber is pressurized, for example, to 2 MPa or more and atmospheric pressure or less.

In the step (5), the film for lamination as an adjacent layer comes into close contact with the exposed surface of the adherend and further conforms to the shape of the exposed surface of the adherend and elongates, and thus a laminate in which the exposed surface of the adherend is covered with the film for lamination as an adjacent layer can be obtained. That is, when the first major surface and lateral surface of the adherend are exposed, a laminate in which the first major surface and lateral surface of the adherend are covered with the film for lamination as an adjacent layer can be obtained. When the first major surface and lateral surface of the adherend are exposed, and further part of the second major surface of the adherend is exposed, a laminate in which the first major surface and lateral surface of the adherend and part of the second major surface of the adherend are covered with the film for lamination as an adjacent layer can be obtained.

After the step (5), further the following steps (6) and (7) are preferably performed (see FIG. 8(e)).

(6) The step of opening the upper side vacuum chamber and the lower side vacuum chamber to return them to atmospheric pressure, and then taking out the laminate.
(7) The step of trimming the unnecessary portion of the film for lamination in close contact with the surface of the adherend 10.

Image Display

The image display of the present disclosure includes the laminate of the present disclosure described above on a display device. The laminate is preferably disposed so that the surface of the laminate on the adherend side faces the display device side.

Examples of the display device include liquid crystal display devices; EL display devices such as organic EL display devices and inorganic EL display devices; plasma display devices; LED display devices such as mini-LED display devices and micro-LED display devices; and display devices using a Quantum dot.

When the display device of the display is a liquid crystal display device, a backlight is necessary on the surface of the liquid crystal display device opposite to the laminate.

The image display may be an image display having a touch panel function.

Examples of the touch panel include types such as a resistive film type, a capacitance type, an electromagnetic induction type, an infrared type, and an ultrasonic type.

For the touch panel function, the touch panel function may be added in the display device as in an in-cell touch panel liquid crystal display device, or the touch panel may be placed on the display device.

EXAMPLES

The present disclosure will be specifically described below by giving Examples and Comparative Examples. The present disclosure is not limited to the modes described in the Examples.

1. Measurement and Evaluation

For the laminates of the Examples and the Comparative Examples, the following measurement and evaluation were performed. The results are shown in Table 1 or 2.

1-1. Softening Points

Samples for softening point measurement in which cross sections of the laminates of the Examples and the Comparative Examples were exposed were fabricated according to the steps (A1) to (A2) in the text of the description.

The softening point F1 of the plastic film and the softening point F2 of the hard coat layer of each of the samples were measured according to the following measurement conditions by using a nanoscale infrared spectroscopic analysis system "Anasys nano IR (trade name)" manufactured by Bruker Nano Inc. and the following probe. For Examples 2 to 8 and Comparative Example 2, the softening point F3 of the heat-sensitive adhesion layer was also measured. The softening points are shown in Table 1 or 2. As described in the text of the description, the softening point F2 of the hard coat layer whose softening point was not measured at 33° C. or more and 300° C. or less was regarded as "more than 300° C.".

Measurement Conditions

Temperature increase rate: 5° C./s
Temperature increase start temperature: 33° C.
Measurement upper limit temperature: 300° C.
Measurement area: 20 μm☐

Probe

Trade name "ThermaLever Probes" manufactured by Bruker Nano Inc.

Details of Probe

Probe model numbers: AN2-300
Cantilever material: Si
Resistor material: Doped Silicon
Length: 300 μm or less
Thickness: 2 μm or less
Tip height: 3 μm or more and 6 μm or less
Spring constant: 0.1 N/m or more and 0.6 N/m or less
Resonant frequency: 15 kHz or more and 30 kHz or less
Tip radius: <30 nm
Max. controllable temperature: 400° C.
Contact: Yes
Intermittent contact: No 1-2. State of Covering Regarding the laminates of the Examples and the Comparative Examples, whether or not the first major surface, lateral surface, and second major surface of the adherend were covered with the film for lamination as an adjacent layer was visually confirmed, and evaluation was performed according to the following criteria. In Comparative Examples 4 to 5, the film for lamination was not used, and the laminate was a toughened glass single body, and therefore "–" is described.

Evaluation of First Major Surface

A: The proportion of the first major surface covered with the film for lamination is 99% or more.
B: The proportion of the first major surface covered with the film for lamination is 90% or more and less than 99%.
C: The proportion of the first major surface covered with the film for lamination is less than 90%.

Evaluation of Lateral surface ("The lateral surface on the first major surface side" hereinafter means the region of 90% of the total surface area of the lateral surface from the first major surface side)
A: The proportion of the lateral surface on the first major surface side covered with the film for lamination is 90% or more.
A-: The proportion of the lateral surface on the first major surface side covered with the film for lamination is 80% or more and less than 90%.
B: The proportion of the lateral surface on the first major surface side covered with the film for lamination is 50% or more and less than 80%.

C: The proportion of the lateral surface on the first major surface side covered with the film for lamination is 5% or more and less than 50%.

D: The proportion of the lateral surface on the first major surface side covered with the film for lamination is less than 5%.

<Evaluation of Second Major Surface>

A: The proportion of the region within 2 mm from the edge of the second major surface covered with the film for lamination is 80% or more.

A-: The proportion of the region within 2 mm from the edge of the second major surface covered with the film for lamination is 70% or more and less than 80%.

B: The proportion of the region within 2 mm from the edge of the second major surface covered with the film for lamination is 50% or more and less than 70%.

C: The proportion of the region within 2 mm from the edge of the second major surface covered with the film for lamination is 5% or more and less than 50%.

D: The proportion of the region within 2 mm from the edge of the second major surface covered with the film for lamination is less than 5%.

1-3. Scattering Prevention Properties

A DuPont impact test was performed in accordance with JIS K5600-5-3. Specifically, a DuPont impact tester (model number: No. 451 DuPont impact tester (for coatings) manufactured by Toyo Seiki Seisaku-sho, Ltd.) was used, an impact head having a hemispherically shaped tip having a radius of 15 mm was allowed to stand on the surface of each of the laminates of Examples 1 to 10 and Comparative Examples 1 to 3 on the side of the film for lamination, and a 600 g weight was dropped on the impact head from a height of 250 mm. The laminates including a toughened glass single body in Comparative Examples 4 to 5 were also evaluated in the same manner. The surface of each of the laminates of Examples 1 to 10 and Comparative Examples 1 to 3 on the side of the film for lamination means the surface of each of the laminates of Examples 1 to 10 and Comparative Examples 1 to 3 on the adjacent layer side. Subsequently, the state of scattering of broken pieces of glass, which was the adherend, was visually confirmed and evaluated according to the following criteria.

The evaluation of scattering prevention properties and the measurement of the in-plane phase difference, the erosion rate, and the shape parameter and the scale parameter described later were carried out in an atmosphere at a temperature of 23±5° C. and a humidity of 40% RH or more and 65% RH or less. Before the start of the measurement or the evaluation, the target sample was exposed to the atmosphere for 30 min or more.

A: Neither large broken pieces nor powdery fine broken pieces are observed.

B: No large broken pieces are observed, but powdery fine broken pieces are slightly observed.

C: No large broken pieces are observed, but powdery fine broken pieces are observed in a large amount.

D: Large broken pieces are observed, which is extremely dangerous.

1-4. In-Plane Phase Differences of Laminates

The in-plane phase difference Re2C in the region (i) in the vicinity of the central portion, the in-plane phase difference Re2E in the region (ii) in the vicinity of the edges, and the in-plane phase difference Re2O in the region (iii) other than the vicinity of the central portion and the vicinity of the edges of each of the laminates of Examples 1 to 10 and Comparative Examples 1 to 2 were measured according to the procedure described in the text of the description using the trade name "RETS-100" manufactured by Otsuka Electronics Co., Ltd.

1-5. Measurement of Erosion Rates

The erosion rates in the following places in the laminates of Examples 1 and 2 were measured using the product number "MSE-A203", an MSE test apparatus from Palmeso Co., Ltd. The method for measuring the erosion rates followed the description in the text of the description. E1/E2 and E3/E4 are shown in Table 1.

The erosion rate in the central portion in the in-plane direction of the plastic film of the laminate (E1).

The erosion rate in the vicinity of the edge in the in-plane direction of the plastic film of the laminate (E2). The erosion rates were measured in the regions within 3 mm from the four corner portions when the plastic film was seen in a planar view, and then the average value of the four erosion rates was taken as E2.

The erosion rate in the central portion in the in-plane direction of the hard coat layer of the laminate (E3).

The erosion rate in the vicinity of the edge in the in-plane direction of the hard coat layer of the laminate (E4). The erosion rates were measured in the regions within 3 mm from the four corner portions when the hard coat layer was seen in a planar view, and then the average value of the four erosion rates was taken as E4.

1-6. Four-Point Bending Test

The shape parameter and the scale parameter of each of the laminates of Examples 9 to 10 and Comparative Examples 3 to 5 were measured using the trade name "Autograph AGX-50kN" from SHIMADZU CORPORATION. The method for measuring the shape parameter and the scale parameter followed the description in the text of the description.

2. Preparation of Application Liquids

The following application liquids were prepared. "Parts" and "%" are based on mass.

Application Liquid 1 for Hard Coat Layer

Urethane acrylate oligomer A 20.6 parts (manufactured by DKS Co. Ltd., trade name "NEW FRONTIER R-1403M(70)-LM")

(solid content 70%, MEK solvent)

Monofunctional methacrylate monomer 18.8 parts (solid content 100%, benzyl methacrylate)

Electrically conductive polymer 7.5 parts (a polymer having a quaternary ammonium base and an acryloyl group)

(solid content 50%, MEK/n-BuOH mixed solvent)

(manufactured by Mitsubishi Chemical Corporation, trade name "Yupimer UV H-6500")

Photopolymerization initiator 0.9 parts
(IGM Resins B.V., trade name "Omnirad 184")
Leveling agent 0.1 parts (effective component: 0.005 parts)
(manufactured by DIC, trade name "MEGAFACE F-568")
Diluting solvent 52.1 parts
MIBK/PGME/n-BuOH=85/7/8 mixed liquid)

Application Liquid 2 for Hard Coat Layer

Urethane acrylate oligomer A 13.3 parts
(solid content 45%, MEK solvent)
Monofunctional acrylate monomer 17.8 parts
(solid content 100%, phenoxyethyl acrylate)
Electrically conductive polymer 6.7 parts
(a polymer having a quaternary ammonium base and an acryloyl group)
(solid content 50%, MEK/n-BuOH mixed solvent)
(manufactured by Mitsubishi Chemical Corporation, trade name "Yupimer UV H-6500")
Trifunctional acrylate monomer 6.7 parts
(pentaerythritol triacrylate)
(Nippon Kayaku Co., Ltd., solid content 100%)
Photopolymerization initiator 0.9 parts
(IGM Resins B.V., trade name "Omnirad 184")
Leveling agent 0.1 parts (effective component: 0.005 parts)
(manufactured by DIC, the trade name "MEGAFACE F-568")
Diluting solvent 54.5 parts
(MIBK/PGME/n-BuOH=85/8/7 mixed liquid)

Application Liquid 3 for Hard Coat Layer

Urethane acrylate oligomer A 49.6 parts
(solid content 45%, MEK solvent)
Photopolymerization initiator 1.0 part
(IGM Resins B.V., trade name "Omnirad 184")
Leveling agent 0.1 parts (effective component: 0.005 parts)
(manufactured by DIC, trade name "MEGAFACE F-568")
Diluting solvent 49.3 parts
(MIBK/PGME/n-BuOH=80/17/13 mixed liquid)

Double-Sided Adhesive Film 1 for Pressure-Sensitive Adhesion Layer Formation

A double-sided adhesive film having separators on both surfaces of a transparent adhesive layer having a thickness of 15 μm (manufactured by Panac Co., Ltd., trade name: PDS1-15HU75) was provided.

Application Liquid 1 for Heat-Sensitive Adhesion Layer

Thermoplastic resin 64.8 parts
(polyester-based resin, manufactured by Toyobo Co., Ltd., trade name "VYLON 63SS")
(solid content 30%, toluene/MEK solvent=75/25)
Photopolymerization initiator 1.3 parts
(IGM Resins B.V., trade name "Omnirad 184")
Leveling agent 0.1 parts (effective component: 0.005 parts)
(manufactured by DIC, trade name "MEGAFACE F-568")
Diluting solvent 33.8 parts
(PGMEA/MEK=71/29 mixed liquid)

Application Liquid 2 for Heat-Sensitive Adhesion Layer

Thermoplastic resin 41.4 parts
(polyester-based urethane resin, manufactured by Toyobo Co., Ltd., trade name "VYLON UR4800")
(solid content 32%, toluene/MEK solvent=50/50)
Polyfunctional monomer 4.6 parts
Photopolymerization initiator 0.9 parts
(IGM Resins B.V., trade name "Omnirad 184")
Leveling agent 0.1 parts (effective component: 0.005 parts)
(manufactured by DIC, trade name "MEGAFACE F-568")
Diluting solvent 53.0 parts
(toluene/MEK=90/10 mixed liquid)

Application Liquid 1 for Low Refractive Index Layer

Ultraviolet-curable compound 2.1 parts
(tri- or higher functional and tetra- or lower functional alkoxylated pentaerythritol acrylate, manufactured by Shin Nakamura Chemical Co., Ltd., trade name "NK Ester ATM-4PL")
Photopolymerization initiator 0.2 parts
(IGM Resins B.V., trade name "Omnirad 127")
Hollow silica 3.7 parts
average particle diameter 60 nm)
Solid silica 0.5 parts
(average particle diameter 12 nm)
Fluorine-based antifouling agent 0.8 parts (effective component: 0.2 parts)
Diluting solvent 92.7 parts
(90/10 mixed liquid of methyl isobutyl ketone and propylene glycol monomethyl ether acetate)

3. Fabrication of Films for Lamination and Laminates

Example 1

Fabrication of Film for Lamination

The application liquid 1 for a hard coat layer was applied to an acrylic film having a thickness of 40 μm (manufactured by Toyo Kohan Co., Ltd., trade name: HX40-UF) so that the thickness after drying was 9 μm, and dried and subjected to ultraviolet irradiation to form a hard coat layer. In the acrylic film, the in-plane phase difference Re1C in the region (i) in the vicinity of the central portion was 3 nm, the in-plane phase difference Re1E in the region (ii) in the vicinity of the edge s was 4 nm, and the in-plane phase difference Re1O in the region (iii) other than the vicinity of the central portion and the vicinity of the edge s was 5 nm.

Then, the application liquid 1 for a low refractive index layer was applied to the hard coat layer so that the thickness after drying was 100 nm, and dried and subjected to ultraviolet irradiation to form an antireflective layer of a single layer of a low refractive index layer.

Then, one separator of the double-sided adhesive film 1 for pressure-sensitive adhesion layer formation was peeled to expose an adhesive surface, and then the adhesive surface was bonded to the surface of the acrylic film opposite to the hard coat layer to obtain the film for lamination of Example 1 having a separator, a pressure-sensitive adhesion layer, an acrylic film, a hard coat layer, and a low refractive index layer in this order.

Fabrication of Laminate

An adherend was disposed in the lower side vacuum chamber of a vacuum compressed air machine having an upper side vacuum chamber and the lower side vacuum chamber so that the first major surface side of the adherend faced the upper side. More specifically, the adherend was disposed on the lifting and lowering stage in the lower side vacuum chamber so that the first major surface side of the adherend faced the upper side. The second major surface of the adherend was disposed so that the region 3 mm from the edge was exposed to the air. As the adherend, soda glass having a length of 100 mm, a width of 100 mm, and a thickness of 1.8 mm in which the edges of the first major surface and the second major surface were R-chamfered was used.

Then, the separator of the film for lamination of Example 1 was peeled, and then the film for lamination was disposed between the upper side vacuum chamber and the lower side vacuum chamber so that the pressure-sensitive adhesion layer faced the lower side. Further the film for lamination was fixed by a jig.

Then, the upper side vacuum chamber and the lower side vacuum chamber were evacuated to 100 Pa or less.

Then, the adherend was pushed up to the upper side vacuum chamber, while the film for lamination was heated, to press the first major surface of the adherend against the heated film for lamination. Then, the upper side vacuum chamber was pressurized at atmospheric pressure in a state in which the film for lamination was heated, to bring the film for lamination into close contact with the exposed surface of the adherend. In these steps, the heating was performed from the ceiling of the upper side vacuum chamber. The film for lamination was heated under conditions under which the surface temperature of the film for lamination was stable at 140° C.

Subsequently, the upper side vacuum chamber and the lower side vacuum chamber were opened and thus allowed to cool to room temperature, and then the laminate was taken out. Further, the edge was trimmed to obtain the laminate of Example 1.

Example 2

Fabrication of Film for Lamination

The film for lamination of Example 2 was obtained in the same manner as Example 1 except that the application liquid 1 for a heat-sensitive adhesion layer was applied to the surface of the acrylic film opposite to the hard coat layer and dried to form a heat-sensitive adhesion layer having a thickness of 8 μm. The film for lamination of Example 2 has the heat-sensitive adhesion layer, the acrylic film, the hard coat layer, and the low refractive index layer in this order.

Fabrication of Laminate

The laminate of Example 2 was obtained in the same manner as Example 1 except that the film for lamination of Example 1 was changed to the film for lamination of Example 2, and further the film for lamination of Example 2 was disposed between the upper side vacuum chamber and the lower side vacuum chamber so that the heat-sensitive adhesion layer of the film for lamination of Example 2 faced the lower side.

Example 3

Fabrication of Film for Lamination

The film for lamination of Example 3 was obtained in the same manner as Example 2 except that the application liquid 1 for a hard coat layer was changed to the application liquid 2 for a hard coat layer. The film for lamination of Example 3 has the heat-sensitive adhesion layer, the acrylic film, the hard coat layer, and the low refractive index layer in this order.

Fabrication of Laminate

The laminate of Example 3 was obtained in the same manner as Example 2 except that the film for lamination of Example 2 was changed to the film for lamination of Example 3.

Example 4

Fabrication of Film for Lamination

The laminate of Example 4 was obtained in the same manner as Example 2 except that the low refractive index layer was not formed on the hard coat layer, and the application liquid 1 for a heat-sensitive adhesion layer was changed to the application liquid 2 for a heat-sensitive adhesion layer. The film for lamination of Example 4 has the heat-sensitive adhesion layer, the acrylic film, and the hard coat layer in this order.

Fabrication of Laminate

The laminate of Example 4 was obtained in the same manner as Example 2 except that the film for lamination of Example 2 was changed to the film for lamination of Example 4.

Example 5

Fabrication of Film for Lamination

The film for lamination of Example 5 was obtained in the same manner as Example 2 except that the application liquid 1 for a hard coat layer was changed to the application liquid 2 for a hard coat layer, and the application liquid 1 for a heat-sensitive adhesion layer was changed to the application liquid 2 for a heat-sensitive adhesion layer. The film for lamination of Example 5 has the heat-sensitive adhesion layer, the acrylic film, the hard coat layer, and the low refractive index layer in this order.

Fabrication of Laminate

The laminate of Example 5 was obtained in the same manner as Example 2 except that the film for lamination of Example 2 was changed to the film for lamination of Example 5.

Example 6

Fabrication of Film for Lamination

The film for lamination of Example 6 was obtained in the same manner as Example 2 except that the application liquid 1 for a hard coat layer was changed to the application liquid 3 for a hard coat layer, and the application liquid 1 for a heat-sensitive adhesion layer was changed to the application liquid 2 for a heat-sensitive adhesion layer. The film for lamination of Example 6 has the heat-sensitive adhesion layer, the acrylic film, the hard coat layer, and the low refractive index layer in this order.

Fabrication of Laminate

The laminate of Example 6 was obtained in the same manner as Example 2 except that the film for lamination of Example 2 was changed to the film for lamination of Example 6.

Example 7

Fabrication of Film for Lamination

The film for lamination of Example 7 was obtained in the same manner as Example 2 except that the acrylic film was changed to an acrylic film having a thickness of 80 μm (manufactured by Sumitomo Chemical Co., Ltd., trade name: W001GU80), and the application liquid 1 for a heat-sensitive adhesion layer was changed to the application liquid 2 for a heat-sensitive adhesion layer. In the acrylic film, the in-plane phase difference Re1C in the region (i) in the vicinity of the central portion was 2 nm, the in-plane phase difference Re1E in the region (ii) in the vicinity of the edges was 6 nm, and the in-plane phase difference Re1O in the region (iii) other than the vicinity of the central portion and the vicinity of the edges was 7 nm. The film for lamination of Example 7 has the heat-sensitive adhesion layer, the acrylic film, the hard coat layer, and the low refractive index layer in this order.

Fabrication of Laminate

The laminate of Example 7 was obtained in the same manner as Example 2 except that the film for lamination of Example 2 was changed to the film for lamination of Example 7.

Example 8

Fabrication of Film for Lamination

The film for lamination of Example 8 was obtained in the same manner as Example 2 except that the acrylic film was changed to a biaxially stretched polyethylene terephthalate film having a thickness of 80 μm. In the polyethylene terephthalate film, the in-plane phase difference Re1C in the region (i) in the vicinity of the central portion was 850 nm, the in-plane phase difference Re1E in the region (ii) in the vicinity of the edges was 891 nm, and the in-plane phase difference Re1O in the region (iii) other than the vicinity of the central portion and the vicinity of the edges was 884 nm. The film for lamination of Example 8 has the heat-sensitive adhesion layer, the polyethylene terephthalate film, the hard coat layer, and the low refractive index layer in this order.

Fabrication of Laminate

The laminate of Example 8 was obtained in the same manner as Example 2 except that the film for lamination of Example 2 was changed to the film for lamination of Example 8.

Example 9

Fabrication of Film for Lamination

For the film for lamination of Example 9, the same one as Example 1 was used.

Fabrication of Laminate

The laminate of Example 9 was obtained in the same manner as Example 1 except that the adherend was changed to toughened glass having a thickness of 1.3 mm (length 130 mm, width 220 mm, thickness of toughened layer: 6 μm, toughened glass in which the edges of the first major surface and the second major surface were R-chamfered).

Example 10

Fabrication of Film for Lamination

For the film for lamination of Example 10, the same one as Example 1 was used.

Fabrication of Laminate

The laminate of Example 10 was obtained in the same manner as Example 1 except that the adherend was changed to toughened glass having a thickness of 1.3 mm (length 130 mm, width 220 mm, thickness of toughened layer: 10 μm, toughened glass in which the edges of the first major surface and the second major surface were R-chamfered).

Comparative Example 1

Fabrication of Film for Lamination

The film for lamination of Comparative Example 1 was obtained in the same manner as Example 1 except that the acrylic film was changed to a triacetyl cellulose film (manufactured by KONICA MINOLTA, INC., trade name KC8UA). The film for lamination of Comparative Example 1 has the separator, the pressure-sensitive adhesion layer, the triacetyl cellulose film, the hard coat layer, and the low refractive index layer in this order.

In the triacetyl cellulose film, the in-plane phase difference Re1C in the region (i) in the vicinity of the central portion was 1 nm, the in-plane phase difference Re1E in the region (ii) in the vicinity of the edges was 1 nm, and the in-plane phase difference Re1O in the region (iii) other than the vicinity of the central portion and the vicinity of the edges was 1 nm.

Fabrication of Laminate

The laminate of Comparative Example 1 was obtained in the same manner as Example 1 except that the film for lamination of Example 1 was changed to the film for lamination of Comparative Example 1, and the heating conditions were changed to conditions under which the surface temperature of the film for lamination was 180° C.

Comparative Example 2

Fabrication of Film for Lamination

The film for lamination of Comparative Example 2 was obtained in the same manner as Example 2 except that the acrylic film was changed to a biaxially stretched polyethylene terephthalate film having a thickness of 80 μm, and further the application liquid 1 for a hard coat layer was changed to the application liquid 3 for a hard coat layer. In the polyethylene terephthalate film, the in-plane phase difference Re1C in the region (i) in the vicinity of the central portion was 850 nm, the in-plane phase difference Re1E in the region (ii) in the vicinity of the edges was 891 nm, and the in-plane phase difference Re1O in the region (iii) other than the vicinity of the central portion and the vicinity of the edges was 884 nm. The film for lamination of Comparative Example 2 has the heat-sensitive adhesion layer, the polyethylene terephthalate film, the hard coat layer, and the low refractive index layer in this order.

Fabrication of Laminate

The laminate of Comparative Example 2 was obtained in the same manner as Example 2 except that the film for lamination of Example 2 was changed to the film for lamination of Comparative Example 2.

Comparative Example 3

The separator of the film for lamination of Example 1 was peeled to expose the pressure-sensitive adhesion layer. The surface of the film for lamination on the exposed pressure-sensitive adhesion layer side was laminated on toughened glass having a thickness of 1.3 mm (length 130 mm, width 220 mm, thickness of toughened layer: 6 μm, toughened glass in which the edges of the first major surface and the second major surface were R-chamfered) to obtain the laminate of Comparative Example 3.

Comparative Example 4

As the laminate of Comparative Example 4, a single body of toughened glass having a thickness of 1.3 mm was provided (length 130 mm, width 220 mm, thickness of toughened layer: 6 μm, toughened glass in which the edges of the first major surface and the second major surface were R-chamfered).

Comparative Example 5

As the laminate of Comparative Example 5, a single body of toughened glass having a thickness of 1.3 mm was provided (length 130 mm, width 220 mm, thickness of toughened layer: 10 μm, toughened glass in which the edges of the first major surface and the second major surface were R-chamfered).

TABLE 1

|  |  | Examples | | | | | | | | Comparative Examples | |
| --- | --- | --- | --- | --- | --- | --- | --- | --- | --- | --- | --- |
|  |  | 1 | 2 | 3 | 4 | 5 | 6 | 7 | 8 | 1 | 2 |
| Softening point (° C.) | F1 | 120.8 | 120.8 | 120.8 | 120.8 | 120.8 | 120.8 | 93.8 | 261.0 | 195.0 | 261.0 |
|  | F2 | More than 300° C. | More than 300° C. | More than 300° C. | More than 300° C. | More than 300° C. | 210.4 | More than 300° C. | More than 300° C. | More than 300° C. | 210.4 |
|  | F3 | — | 37.6 | 37.6 | 110.0 | 110.0 | 110.0 | 37.6 | 37.6 | — | 37.6 |
| State of Covering | First major surface | A | A | A | A | A | A | A | A | A | C |
|  | Lateral surface | A | A | A | A | A | A | A- | B | C | D |
|  | Second major surface | A | A | A | A | A | A | B | C | C | D |
| Erosion rates | E1/E2 | 0.91 | 0.95 | — | — | — | — | — | — | — | — |
|  | E3/E4 | 1.00 | 0.99 | — | — | — | — | — | — | — | — |
| In-plane phase difference (nm) | Re2C | 3.0 | 4.0 | 4.0 | 4.0 | 4.0 | 3.0 | 3.0 | 850.0 | 1.0 | 850.0 |
|  | Re2E | 4.0 | 2.0 | 3.0 | 3.0 | 3.0 | 4.0 | 6.0 | 891.0 | 1.0 | 891.0 |
|  | Re2O | 5.0 | 3.0 | 4.0 | 4.0 | 4.0 | 4.0 | 5.0 | 884.0 | 1.0 | 884.0 |

TABLE 2

|  |  | Examples | | Comparative Examples | | |
|---|---|---|---|---|---|---|
|  |  | 9 | 10 | 3 | 4 | 5 |
| Softening point (° C.) | F1 | 120.8 | 120.8 | — | — | — |
|  | F2 | More than 300° C. | More than 300° C. | — | — | — |
|  | F3 | — | — | — | — | — |
| State of Covering | First major surface | A | A | A | — | — |
|  | Lateral surface | A | A | D | — | — |
|  | Second major surface | A | A | D | — | — |
| Shape parameter |  | 2.5 | 10.6 | 16.9 | 45.2 | 21.4 |
| Scale parameter |  | 3563 | 4726 | 4634 | 4721 | 4742 |
| Scattering prevention properties |  | A | A | C | D | D |
| In-plane phase difference (nm) | Re2C | 4.0 | 4.0 | — | — | — |
|  | Re2E | 2.0 | 2.0 | — | — | — |
|  | Re2O | 3.0 | 3.0 | — | — | — |

As is clear from Tables 1 and 2, it can be confirmed that in the laminates of the Examples, when the protective plate breaks due to an impact, not only the scattering of large broken pieces but the scattering of powdery fine broken pieces can be suppressed. From the comparison of Examples 1 to 7 with Example 8, it can be confirmed that when F1<F2 holds, and the Re1 of the plastic film is 100 nm or less, a synergistic effect is produced, the first major surface and lateral surface of the adherend can be extremely easily covered, and the scattering prevention properties can be made good. From the comparison of Examples 9 to 10 with Comparative Examples 3 to 5, it can be confirmed that in laminates having a shape parameter of 16.0 or less, the scattering prevention properties can be made good.

REFERENCE SIGNS LIST

10: adherend
10a: first major surface
10b: second major surface
10c: lateral surface
20: adjacent layer
20A: film for lamination
21: adhesion layer
22: plastic film
23: hard coat layer
24: antireflective layer
30: vacuum compressed air machine
31, 32: vacuum chamber
33: stage
34: partition plate
100: laminate
200: load span
201: load pin
202: base
300: support span
301: support pin
302: base
1100: container
1200: receiver
2100: test liquid piping
2200: compressed air piping
2300: return piping
3100, 3200: flowmeter
4100, 4200: pressure gauge
5000: jet portion
5100: nozzle
5200: housing
6000: cross-sectional profile acquisition portion
8100: specimen mounting stage
8200: support
100: erosion rate measuring apparatus
A1: water
A2: spherical silica
A3: air
A4: abraded laminate

The invention claimed is:

1. A laminate comprising an adherend and an adjacent layer, wherein
the adherend has a first major surface, a second major surface being a back surface of the first major surface, and a lateral surface connecting an edge of the first major surface and an edge of the second major surface,
at least the first major surface and the lateral surface of the adherend are covered with the adjacent layer,
the adjacent layer covers the first major surface of the adherend and continuously extends over the lateral surface of the adherend to cover the second major surface in a vicinity of the edge of the second major surface,
the adjacent layer comprises an adhesion layer, a plastic film and a hard coat layer containing a cured product of a curable resin composition in this order from the adherend side, and
a softening point F1 of the plastic film and a softening point F2 of the hard coat layer satisfy a relationship of F1<F2.

2. The laminate according to claim 1, wherein further a vicinity of the edge of the second major surface of the adherend is covered with the adjacent layer.

3. The laminate according to claim 1, wherein the adherend is glass.

4. The laminate according to claim 1, wherein an outer peripheral edge of the first major surface of the adherend is chamfered over a generally entire periphery.

5. The laminate according to claim 1, wherein the softening point F1 of the plastic film is 70° C. or more and 150° C. or less.

6. The laminate according to claim 1, wherein when an average of an in-plane phase difference of the plastic film is defined as Re1, Re1 is 100 nm or less.

7. The laminate according to claim 1, wherein when an average of an in-plane phase difference of the laminate is defined as Re2, Re2 is 100 nm or less.

8. The laminate according to claim 7, wherein when an in-plane phase difference in a vicinity of a central portion and an in-plane phase difference in a vicinity of an edge of the laminate are defined as Re2C and Re2E respectively, an absolute value of a difference between Re2C and Re2E is 10 nm or less.

9. The laminate according to claim 1, wherein a thickness of the hard coat layer is 1 μm or more and 20 μm or less.

10. The laminate according to claim 1, wherein the adhesion layer is a heat-sensitive adhesion layer.

11. The laminate according to claim 1, wherein the adjacent layer has an antireflective layer on a side of the hard coat layer opposite to the plastic film.

12. The laminate according to claim 1, wherein the following shape parameter is 16.0 or less:
<Calculation of Shape Parameter and Scale Parameter according to Four-Point Bending Test>

Twenty samples in which the laminate is cut to a width of 130 mm are fabricated; the sample is placed on a support span so that the second major surface side of the adherend faces the support span, and then a four-point bending test is carried out on each sample to measure a rupture stress of each sample; for test conditions, a distance between supporting points of a load span is 20 mm, a distance between supporting points of the support span is 40 mm, and a load rate is 5 mm/min; and twenty measured values of the rupture stress are subjected to Weibull distribution analysis to calculate a shape parameter and a scale parameter of the laminate.

13. A method for manufacturing a laminate that comprises an adherend and an adjacent layer, the adherend having a first major surface, a second major surface being a back surface of the first major surface, and a lateral surface connecting an edge of the first major surface and an edge of the second major surface, the method comprising the following steps (1) to (5):
  (1) a step of disposing an adherend in a lower side vacuum chamber of a vacuum compressed air machine having an upper side vacuum chamber and the lower side vacuum chamber so that a first major surface side faces an upper side;
  (2) a step of disposing a film for lamination, which comprises an adhesion layer, a plastic film, and a hard coat layer containing a cured product of a curable resin composition in this order, between the upper side vacuum chamber and the lower side vacuum chamber so that the adhesion layer faces a lower side;
  (3) a step of evacuating the upper side vacuum chamber and the lower side vacuum chamber;
  (4) a step of pushing up the adherend to the upper side vacuum chamber, while heating the film for lamination, to press the first major surface of the adherend against the heated film for lamination; and
  (5) a step of pressurizing the upper side vacuum chamber in a state in which the film for lamination is heated, to bring the film for lamination into close contact with an exposed surface of the adherend to form the adjacent layer, the adjacent layer covering the first major surface of the adherend and continuously extending over the lateral surface of the adherend to cover the second major surface in a vicinity of the edge of the second major surface.

14. The method for manufacturing a laminate according to claim 13, wherein in the step (4) and the step (5), the film for lamination is heated so that surface temperature on the hard coat layer side based on the plastic film of the film for lamination exceeds the softening point F1 of the plastic film.

15. A film for lamination comprising at least an adhesion layer, a plastic film, and a hard coat layer containing a cured product of a curable resin composition in this order, wherein a softening point F1 of the plastic film and a softening point F2 of the hard coat layer satisfy a relationship of F1<F2.

16. An image display comprising the laminate according to claim 1 on a display device.

* * * * *